US008555022B1

(12) United States Patent
Edwards et al.

(10) Patent No.: US 8,555,022 B1
(45) Date of Patent: Oct. 8, 2013

(54) ASSIMILATION OF FOREIGN LUNS INTO A NETWORK STORAGE SYSTEM

(75) Inventors: John K. Edwards, Sunnyvale, CA (US); Steven R. Kleiman, Los Altos, CA (US)

(73) Assignee: NetApp, Inc., Sunnyvale, CA (US)

( * ) Notice: Subject to any disclaimer, the term of this patent is extended or adjusted under 35 U.S.C. 154(b) by 505 days.

(21) Appl. No.: 12/683,390

(22) Filed: Jan. 6, 2010

(51) Int. Cl.
*G06F 12/00* (2006.01)

(52) U.S. Cl.
USPC .......................................... 711/170; 711/114

(58) Field of Classification Search
USPC ....................................................... 711/170
See application file for complete search history.

(56) References Cited

U.S. PATENT DOCUMENTS

| | | | | |
|---|---|---|---|---|
| 7,743,214 | B2 * | 6/2010 | Adams et al. ................. | 711/117 |
| 7,818,515 | B1 * | 10/2010 | Umbehocker et al. ........ | 711/154 |
| 7,899,987 | B2 * | 3/2011 | Salomon et al. .............. | 711/112 |
| 8,046,535 | B2 * | 10/2011 | Shibayama et al. .......... | 711/114 |
| 2005/0114438 | A1 * | 5/2005 | Bendich et al. ............... | 709/203 |
| 2006/0206682 | A1 * | 9/2006 | Manbert et al. ............... | 711/170 |
| 2006/0224843 | A1 * | 10/2006 | Rao et al. ...................... | 711/161 |
| 2006/0248379 | A1 * | 11/2006 | Jernigan ........................... | 714/6 |
| 2007/0094465 | A1 * | 4/2007 | Sharma et al. ................ | 711/162 |
| 2008/0126673 | A1 * | 5/2008 | Kaneda ........................... | 711/103 |
| 2008/0184068 | A1 * | 7/2008 | Mogi et al. ...................... | 714/15 |
| 2008/0288714 | A1 * | 11/2008 | Salomon et al. ............... | 711/103 |
| 2008/0307191 | A1 * | 12/2008 | Lane et al. ..................... | 711/209 |
| 2009/0043983 | A1 * | 2/2009 | Yagawa ......................... | 711/170 |
| 2010/0211620 | A1 * | 8/2010 | Matsuzawa et al. .......... | 707/822 |
| 2010/0211731 | A1 * | 8/2010 | Mittendorff et al. .......... | 711/113 |
| 2010/0274971 | A1 * | 10/2010 | Solihin ......................... | 711/122 |
| 2010/0281230 | A1 * | 11/2010 | Rabii et al. .................... | 711/165 |
| 2010/0306467 | A1 * | 12/2010 | Pruthi et al. .................. | 711/114 |
| 2011/0010514 | A1 * | 1/2011 | Benhase et al. ............... | 711/162 |
| 2011/0093679 | A1 * | 4/2011 | Cyr et al. ....................... | 711/170 |

* cited by examiner

*Primary Examiner* — Kaushikkumar Patel
(74) *Attorney, Agent, or Firm* — Perkins Coie LLP

(57) ABSTRACT

A storage system provides highly flexible data layouts that can be tailored to various different applications and use cases. The system defines several types of data containers, including "regions", "logical extents" and "slabs". Each region includes one or more logical extents. Allocated to each logical extent is at least part of one or more slabs allocated to the region that includes the extent. Each slab is a set of blocks of storage from one or more physical storage devices. The slabs can be defined from a heterogeneous pool of physical storage. The system also maintains multiple "volumes" above the region layer. Each volume includes one or more logical extents from one or more regions. A foreign LUN can be assimilated into the system by defining slabs as separate portions of the foreign LUN. Layouts of the extents within the regions are not visible to any of the volumes.

39 Claims, 26 Drawing Sheets

ASSIMILATION OF FOREIGN LUNS INTO A NETWORK STORAGE SYSTEM

FIELD OF THE INVENTION

At least one embodiment of the present invention pertains to data storage systems, and more particularly, to a technique for assimilating foreign logical units (LUNs) into a network storage system.

BACKGROUND

Network based storage (or simply, "network storage") is a common approach to backing up data, making large amounts of data accessible to multiple users, and other purposes. In a network storage environment, a storage server makes data available to client (host) systems by presenting or exporting to the clients one or more logical containers of data. There are various forms of network storage, including network attached storage (NAS) and storage area network (SAN). In a NAS context, a storage server services file-level requests from clients, whereas in a SAN context a storage server services block-level requests. Some storage servers are capable of servicing both file-level requests and block-level requests.

The technology marketplace has been experiencing several trends that impact existing network storage technologies. For example, the number of random input-output operations (IOPS) per-unit-cost of solid-state storage such as flash memory has leapfrogged that of more traditional storage media such as hard disk drives (HDDs). Also, the ratio of spinning media IOPS to capacity for HDDs is diminishing as disk sizes increase. These trends make it increasingly desirable to incorporate solid-state storage into network storage systems. Yet doing so with existing systems can be complicated and may require expensive modifications. In addition, there are indications that faster microprocessor cores will not be achievable indefinitely, and that in the future the emphasis will be more on including more cores per machine than on designing faster cores.

In addition, it is becoming more important in the marketplace for network storage systems to be highly adaptable to different applications and performance profiles. Yet in existing network storage systems, the file system code tends to be tightly coupled with low-level layout code. That tight coupling results in increasing complexity when attempting to adapt a given system to different uses. Conventional network storage systems each generally use a single data layout, which may be adequate (or perhaps better than adequate) for some uses, but generally cannot be optimal for any, much less all, of the myriad storage-related applications that the marketplace requires.

The competitive landscape also increasingly favors the use of storage space efficiency techniques, such as deduplication, and related technologies such as snapshots and cloning. These techniques are all commonly implemented by using block sharing, a technique in which data blocks on storage media are shared by two or more logical data entities (e.g., files) to avoid storing separate identical instances of those blocks. However, the data layout techniques used to achieve block sharing often adversely affect performance, particularly sequential I/O latency, since a shared block typically cannot be in the ideal location for all of the data containers that use it. In effect, block sharing creates data fragmentation. Consequently, a network storage system designer must make a design-time choice about how much weight to give these competing concerns. That choice will then fix the performance characteristics of the system and is extremely difficult if not impossible to change once the design has been implemented and productized.

SUMMARY

Introduced below are a layout and file system architecture for a network storage system, and associated methods and apparatus, collectively called "the system introduced here" or simply "the system" in the discussion which follows. The system provides highly flexible data layouts that can be tailored to numerous different applications and use cases. Among other features, the system is capable of dynamically balancing performance with block sharing, based on, for example, service level objectives (SLOs), as discussed below.

The system is based in part upon the inventors' recognition of the fact that high level file system constructs such as files, permissions and quotas are fundamentally distinct from low level constructs such as physical storage and layouts, the system separates the two with a "logical extent" interface. This distinction can be used advantageously to allow more varied high level "file systems" with simpler design and low level "layouts". Rather than communicating physical details of physical storage devices throughout the system, the system introduced here communicates expectations of the performance, space efficiency and reliability of data throughout the storage system, freeing the high level file systems (and ultimately the users) from management of lower-level details such as data placement to a particular storage device and the layout of data on that device.

The system in at least one embodiment defines several types of logical constructs for data, including "regions", "logical extents" (or simply "extents") and "slabs", all of which are defined and described further below. A logical extent (or "extent") of data is the basic data management unit of the system and can have variable length. The system defines multiple "regions" to contain one or more logical extents of data. A slab is a collection of physical blocks of one or more physical storage devices and is the unit of physical storage apportioned to individual regions. A logical extent is allocated to at least a portion of one or more slabs that make up the region that includes the logical extent.

The system also maintains multiple "volumes" as logical containers of data in a volume layer above the region layer. Each volume includes one or more of the logical extents from one or more of the regions. Notably, the layouts (locations) of the logical extents within the regions are not visible to any of the volumes. This is because the region layer, which determines the layouts of data on the physical storage devices, is distinct and independent from the volume layer, such that there is no need for the volume layer to have any knowledge of such things.

The various slabs can be defined from a heterogeneous pool of physical storage devices, and any given region can include extents built from slabs of two or more different types of physical storage device, such as flash memory, solid-state drives (SSDs), HDDs, etc. Also, a foreign logical unit (LUN) (defined below) can be assimilated into the system by defining one or more slabs as separate portions of the foreign LUN.

To balance performance with block sharing, the system can make block sharing or duplication decisions dynamically (i.e., during run-time) and continually, by determining whether to share blocks between two or more logical extents, based on, for example, SLOs applicable to the blocks (e.g., the SLO of a logical extent or volume to which a given block is allocated). For example, the system may allow sharing of a block between two or more logical extents only when it will not cause violation of the applicable SLO(s). The system can also determine whether a block can be moved, based on an SLO applicable to the block, by, for example, allowing a move of the block only when such move will not cause violation of the SLO. The system also can determine when a particular block of physical storage should be copied to a new location in order to meet an SLO that is not being met or that is about to be violated.

An SLO can be associated with each logical extent. Each region can support one or more SLOs (depending on the type(s) of slabs that make up its extents), and different regions can support non-identical sets of SLOs. A volume can determine an SLO for a particular one of its logical extents, based on user-specified expectations, and then assign that logical extent to a region which can support that SLO. A particular volume can also contain logical extents that reside (logically) in at least two different regions.

Other aspects of the technique will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
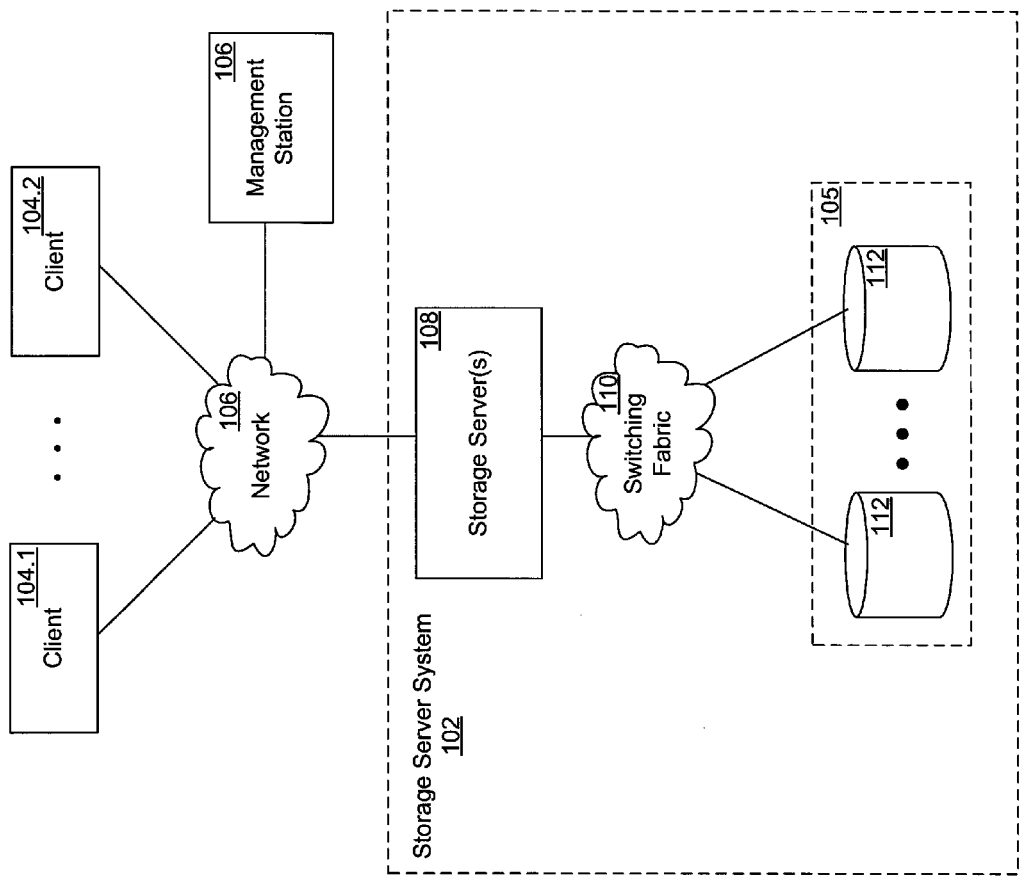
FIG. 1 illustrates a network storage environment in which the present invention can be implemented.

References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

I. Overview

The system introduced here includes a layout and file system architecture for a network storage system, as well as associated methods and apparatus. Among other features, the system is capable of dynamically balancing performance with block sharing, based on, for example, SLOs. An SLO is a specified minimum level of service for a particular parameter or category, such as: performance (e.g., throughput or latency); data availability (e.g., a recovery time objective (RTO) or surviving failure of multiple storage devices); data integrity (e.g., a tolerable error rate or verification with application-specific context, such as validation of a checksum embedded in a database system page stored within an extent); space efficiency (e.g., compression and deduplication); encryption; power efficiency; etc. Other types of SLOs can also be envisioned and employed.

In one embodiment the system incorporates the following principles:

1) Heterogeneous Physical Storage: A given implementation of the system can contain several classes of storage, including flash memory and HDDs. The system therefore provides a way to blend the performance characteristics of these storage devices. It facilitates the integration of new classes of storage and their simple deployment in the system framework and existing system installations.

2) Ubiquitous Data Sharing: The system supports a high degree of data sharing between objects. It unifies the data sharing associated with snapshots and clones with the data sharing associated with deduplication, under a single sharing mechanism.

3) Managed Data Expectations/Objectives: Management software and administrators have performance, space efficiency, and reliability expectations for pieces of data. Rather than the micromanagement of physical resources traditionally required of users (e.g., "Place this file on flash . . . "), users can simply manage expectations on data by communicating those expectations to the system, for example, as SLOs, using storage management software. The system then uses the storage available to it to attempt to attempt to meet those expectations.

4) Free Movement of Data: The system assumes the need for continual data movement within the system. This allows the system to adapt to changing expectations on data, changing usage patterns, and changing availability of various classes of physical storage. This approach allows for the defragmentation and grooming required to maintain essentially any volume or file system.

5) Compartmentalization and Parallelization: The system breaks down the traditional notion of a file system into smaller pieces. This decomposition reduces the complexity of any particular part of the system, allowing for simpler and varied implementations to support the above goals. Run-time benefits include (at least in a software-based implementation) isolation for processor parallelization of checking and repair.

The multiple-region design lends itself to parallel execution where each independent region can be executed on a different thread/context assigned to a different core. Different regions share no state or data structures with each other or with the volumes above them. Consequently, requests that operate on different regions (or volumes) can run in parallel with little locking overhead or contention.

II. System Environment

Figure 2:
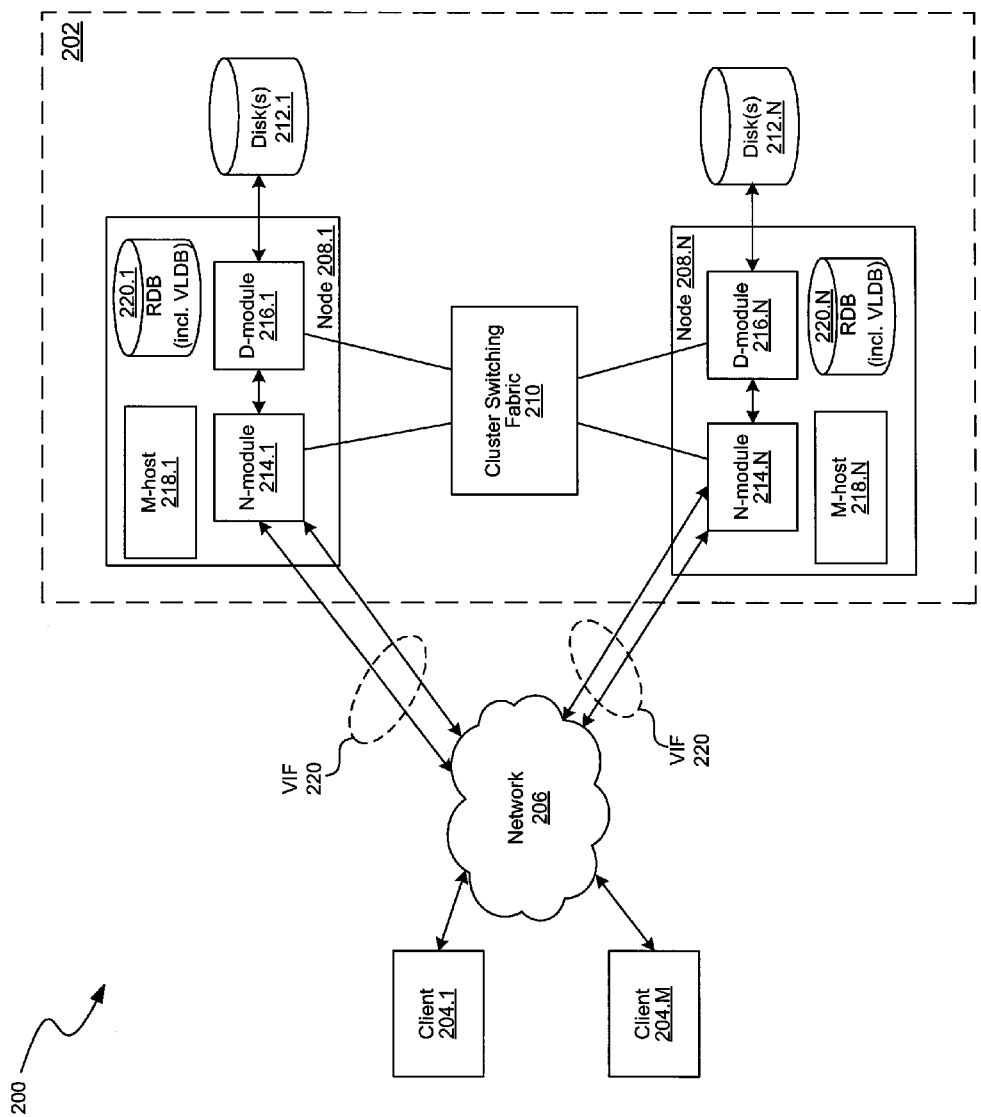
FIG. 2 illustrates a clustered network storage environment in which the present invention can be implemented.

FIGS. 1 and 2 show, at different levels of detail, a network configuration in which the system can be implemented. In particular, FIG. 1 shows a network data storage environment, which includes a plurality of client systems 104.1-104.2, a storage server system 102, and computer network 106 connecting the client systems 104.1-104.2 and the storage server system 102. As shown in FIG. 1, the storage server system 102 includes at least one storage server 108, a switching fabric 110, and a number of mass storage devices 112, such as disks, in a mass storage subsystem 105. Alternatively, some or all of the mass storage devices 212 can be other types of storage, such as flash, SSDs, tape storage, etc.

The storage server (or servers) 108 may be, for example, one of the FAS family of storage server products available from NetApp, Inc. The client systems 104.1-104.2 are connected to the storage server 108 via the computer network 106, which can be a packet-switched network, for example, a local area network (LAN) or wide area network (WAN). Further, the storage server 108 is connected to the disks 112 via a switching fabric 110, which can be a fiber distributed data interface (FDDI) network, for example. It is noted that, within the network data storage environment, any other suitable numbers of storage servers and/or mass storage devices, and/or any other suitable network technologies, may be employed.

The storage server 108 can make some or all of the storage space on the disk(s) 112 available to the client systems 104.1-104.2. For example, each of the disks 112 can be implemented as an individual disk, multiple disks (e.g., a RAID group) or any other suitable mass storage device(s). The storage server 108 can communicate with the client systems 104.1-104.2 according to well-known protocols, such as the Network File System (NFS) protocol or the Common Internet File System (CIFS) protocol, to make data stored on the disks 112 available to users and/or application programs. The storage server 108 can present or export data stored on the disk 112 as volumes to each of the client systems 104.1-104.2. A "volume" is an abstraction of physical storage, combining one or more physical mass storage devices (e.g., disks) or parts thereof into a single logical storage object (the volume), and which is managed as a single administrative unit, such as a single file system. A "file system" is a structured (e.g., hierarchical) set of stored logical containers of data (e.g., volumes, logical units (LUNs), directories, files). Note that a "file system" does not have to include or be based on "files" per se; a file system can be any structured set of logical containers of data, such as files, directories, LUNs, etc. A "block", as the term is used herein, is the smallest addressable unit of contiguous data used by a given storage system to manipulate and transfer data. In conventional storage systems, a block is commonly (though not necessarily) 4 KB in length.

Various functions and configuration settings of the storage server 108 and the mass storage subsystem 105 can be controlled from a management station 106 coupled to the network 106. Among many other operations, a data object migration operation can be initiated from the management station 106.

FIG. 2 depicts a network data storage environment, which can represent a more detailed view of the environment in FIG. 1. Note that the clustered environment of FIG. 2 is only an example of an environment in which the system introduced here can be implemented. The system introduced here can alternatively be implemented in a non-clustered network storage environment. Likewise, the system introduced here is not limited to being implemented within a storage server, i.e., it can be implemented in essentially any form of processing/computing system.

The environment 200 in FIG. 2 includes a plurality of client systems 204 (204.1-204.M), a clustered storage server system 202, and a computer network 206 connecting the client systems 204 and the clustered storage server system 202. As shown in FIG. 2, the clustered storage server system 202 includes a plurality of server nodes 208 (208.1-208.N), a cluster switching fabric 210, and a plurality of mass storage devices 212 (212.1-212.N), which can be disks, as henceforth assumed here to facilitate description. Alternatively, some or all of the mass storage devices 212 can be other types of storage, such as flash memory, SSDs, tape storage, etc. Note that more than one mass storage device 212 can be associated with each node 208.

Each of the nodes 208 is configured to include several modules, including an N-module 214, a D-module 216, and an M-host 218 (each of which can be implemented by using a separate software module) and an instance of a replicated database (RDB) 220. Specifically, node 208.1 includes an N-module 214.1, a D-module 216.1, and an M-host 218.1; node 208.N includes an N-module 214.N, a D-module 216.N, and an M-host 218.N; and so forth. The N-modules 214.1-214.M include functionality that enables nodes 208.1-208.N, respectively, to connect to one or more of the client systems 204 over the network 206, while the D-modules 216.1-216.N provide access to the data stored on the disks 212.1-212.N, respectively. The M-hosts 218 provide management functions for the clustered storage server system 202. Accordingly, each of the server nodes 208 in the clustered storage server arrangement provides the functionality of a storage server.

The RDB 220 is a database that is replicated throughout the cluster, i.e., each node 208 includes an instance of the RDB 220. The various instances of the RDB 220 are updated regularly to bring them into synchronization with each other. The RDB 220 provides cluster-wide storage of various information used by all of the nodes 208, including a volume location database (VLDB) (not shown). The VLDB is a database that indicates the location within the cluster of each volume in the cluster (i.e., the owning D-module 216 for each volume) and is used by the N-modules 214 to identify the appropriate D-module 216 for any given volume to which access is requested.

The nodes 208 are interconnected by a cluster switching fabric 210, which can be embodied as a Gigabit Ethernet switch, for example. The N-modules 214 and D-modules 216 cooperate to provide a highly-scalable, distributed storage system architecture of a clustered computing environment implementing exemplary embodiments of the present invention. Note that while there is shown an equal number of N-modules and D-modules in FIG. 2, there may be differing numbers of N-modules and/or D-modules in accordance with various embodiments of the technique described here. For example, there need not be a one-to-one correspondence between the N-modules and D-modules. As such, the description of a node 208 comprising one N-module and one D-module should be understood to be illustrative only.

Figure 3:
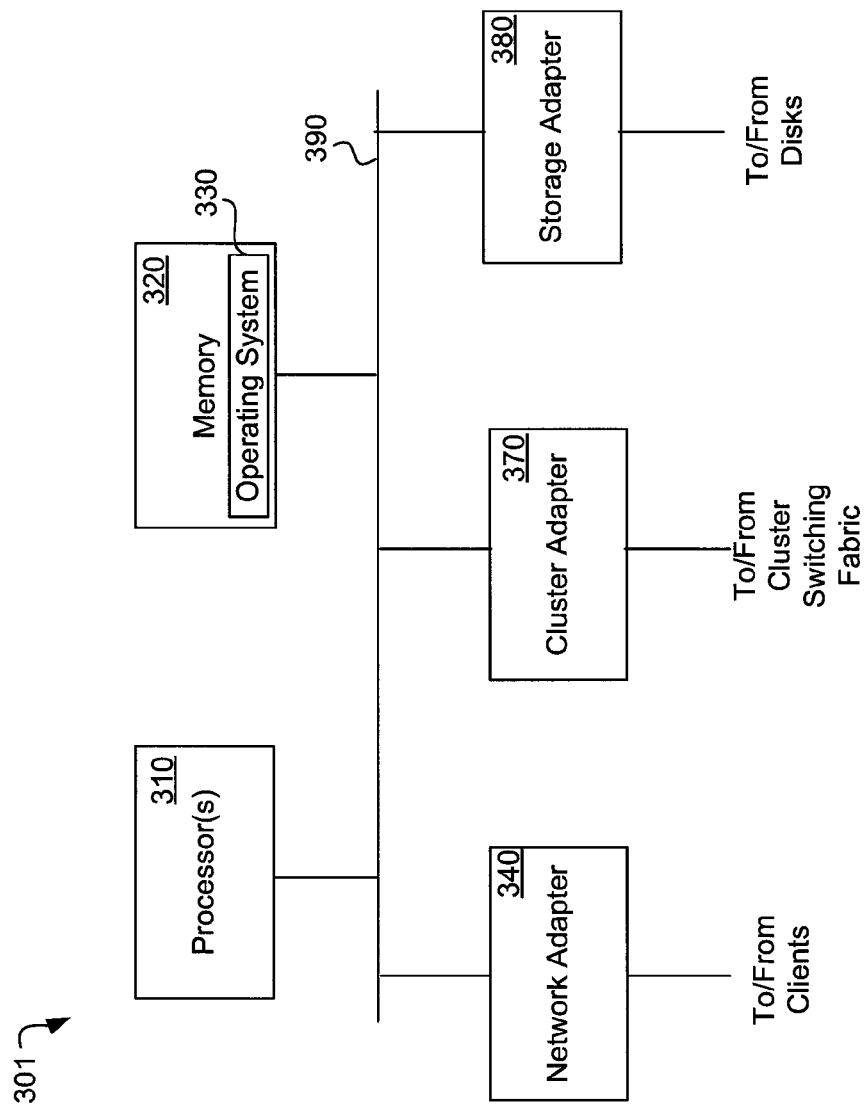
FIG. 3 is a high-level block diagram showing an example of the hardware architecture of a storage controller that can implement one or more storage server nodes.

FIG. 3 is a diagram illustrating an example of a storage controller that can implement one or more of the storage server nodes 208. In an exemplary embodiment, the storage controller 301 includes a processor subsystem that includes one or more processors 310 connected to an interconnect 390. The storage controller 301 further includes a memory 320, a network adapter 340, a cluster access adapter 370 and a storage adapter 380, all interconnected by the interconnect 390. The cluster access adapter 370 includes multiple ports adapted to couple the node 208 to other nodes 208 of the cluster. In the illustrated embodiment, Ethernet is used as the clustering protocol and interconnect media, although other types of protocols and interconnects may be utilized within the cluster architecture described herein. In alternative embodiments where the N-modules and D-modules are implemented on separate storage systems or computers, the cluster access adapter 270 is utilized by the N-module 214 and/or D-module 216 for communicating with other N-modules and/or D-modules of the cluster.

The storage controller 301 can be embodied as a single- or multi-processor storage system executing a storage operating system 330 that preferably implements a high-level module, such as a storage manager, to logically organize the information as a hierarchical structure of named directories, files and special types of files called virtual disks (hereinafter generally "blocks") on the disks. Illustratively, one processor 310 can execute the functions of the N-module 214 on the node 208 while another processor 310 executes the functions of the D-module 216.

The memory 320 illustratively comprises storage locations that are addressable by the processors and adapters 340, 370, 380 for storing software program code and data structures associated with the present invention. The processor 310 and adapters may, in turn, comprise processing elements and/or logic circuitry configured to execute the software code and manipulate the data structures. The storage operating system 330, portions of which is typically resident in memory and executed by the processors(s) 310, functionally organizes the storage controller 301 by (among other things) configuring the processor(s) 310 to invoke storage operations in support of the storage service provided by the node 208. It will be apparent to those skilled in the art that other processing and memory implementations, including various computer readable storage media, may be used for storing and executing program instructions pertaining to the technique introduced here.

The network adapter 340 includes multiple ports to couple the storage controller 301 to one or more clients 204 over point-to-point links, wide area networks, virtual private networks implemented over a public network (Internet) or a shared local area network. The network adapter 340 thus can include the mechanical, electrical and signaling circuitry needed to connect the storage controller 301 to the network 206. Illustratively, the network 206 can be embodied as an Ethernet network or a Fibre Channel (FC) network. Each client 204 can communicate with the node 208 over the network 206 by exchanging discrete frames or packets of data according to pre-defined protocols, such as TCP/IP.

The storage adapter 380 cooperates with the storage operating system 330 to access information requested by the clients 204. The information may be stored on any type of attached array of writable storage media, such as magnetic disk or tape, optical disk (e.g., CD-ROM or DVD), flash memory, solid-state disk (SSD), electronic random access memory (RAM), micro-electro mechanical storage and/or any other similar media adapted to store information, including data and parity information. However, as illustratively described herein, the information is stored on disks 212. The storage adapter 380 includes a plurality of ports having input/output (I/O) interface circuitry that couples to the disks over an I/O interconnect arrangement, such as a conventional high-performance, Fibre Channel (FC) link topology.

Storage of information on disks 212 can be implemented as one or more storage volumes that map to a collection of physical storage devices, which can be divided into one or more RAID groups.

The storage operating system 330 facilitates clients' access to data stored on the disks 212. In certain embodiments, the storage operating system 330 implements a file system that cooperates with one or more virtualization modules to "virtualize" the storage space provided by disks 212. In certain embodiments, a storage manager 460 (FIG. 4) logically organizes the stored data, that described further below. In one embodiment, the storage operating system 330 implements write-anywhere and copy-on-write functionality; that is, any data or metadata can be written to any free physical data block, and a modification to any logical data block is always written to a new physical data block rather than overwriting the original physical data block.

Figure 4:
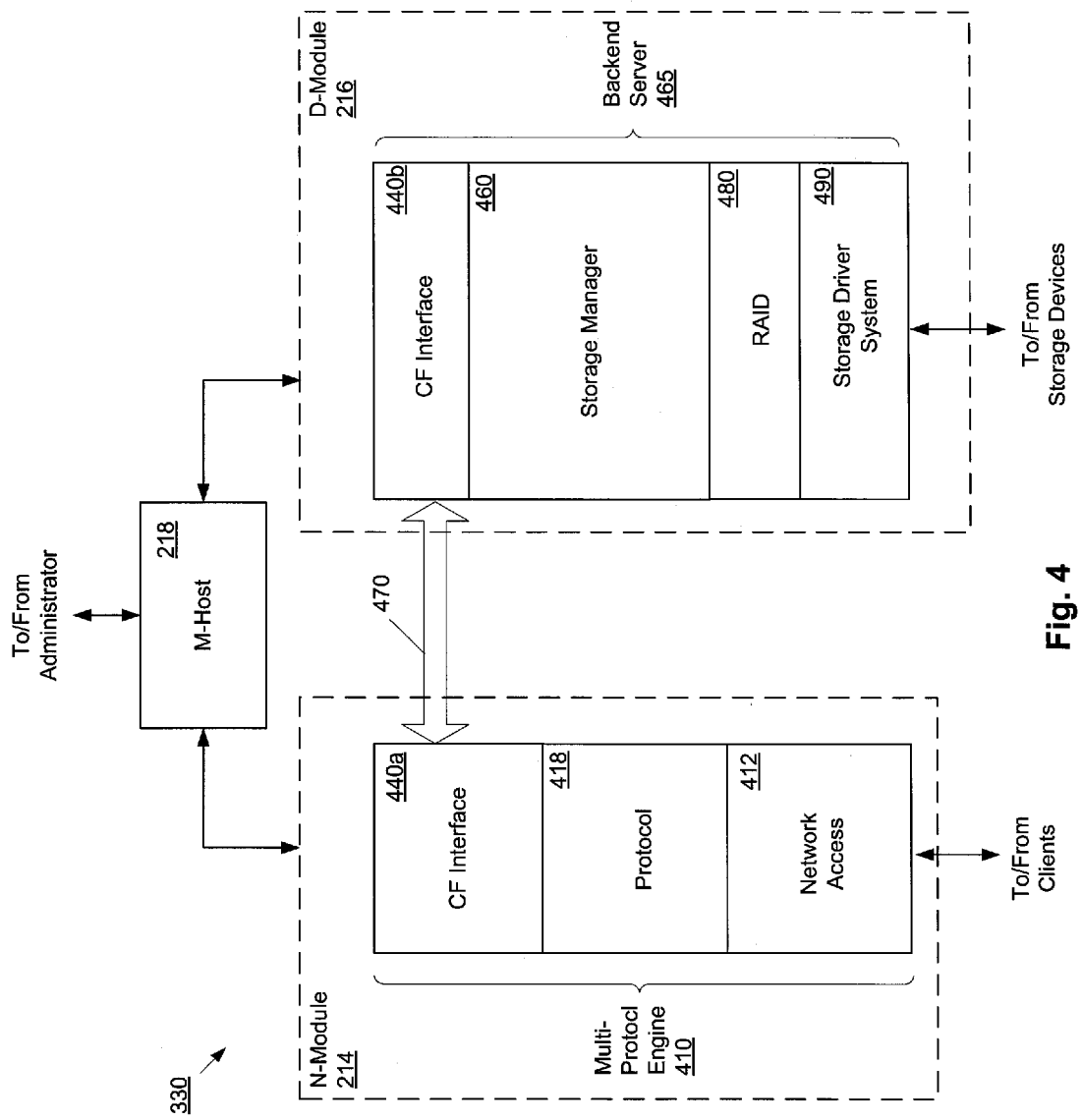
FIG. 4 illustrates an example of a storage operating system of a storage server node.

FIG. 4 is a diagram illustrating an example of storage operating system 330 that can be used with the techniques introduced here. In the illustrated embodiment the storage operating system 330 includes multiple functional layers organized to form an integrated network protocol stack or, more generally, a multi-protocol engine 410 that provides data paths for clients to access information stored on the node using block and file access protocols. The multiprotocol engine 410 in combination with underlying processing hardware also forms the N-module 214. The multi-protocol engine 410 includes a network access layer 412 which includes one or more network drivers that implement one or more lower-level protocols to enable the processing system to communicate over the network 206, such as Ethernet, Internet Protocol (IP), Transport Control Protocol/Internet Protocol (TCP/IP), Fibre Channel Protocol (FCP) and/or User Datagram Protocol/Internet Protocol (UDP/IP). The multiprotocol engine 410 also includes a protocol layer which implements various higher-level network protocols, such as Network File System (NFS), Common Internet File System (CIFS), Hypertext Transfer Protocol (HTTP), Internet small computer system interface (iSCSI), etc. Further, the multi-protocol engine 410 includes a cluster fabric (CF) interface module 440a which implements intra-cluster communication with D-modules and with other N-modules.

In addition, the storage operating system 330 includes a set of layers organized to form a backend server 465 that provides data paths for accessing information stored on the disks 212 of the node 208. The backend server 465 in combination with underlying processing hardware also forms the D-module 216. To that end, the backend server 465 includes a storage manager module 460 that manages any number of volumes 472, a RAID system module 480 and a storage driver system module 490.

The storage manager 460 primarily manages a file system (or multiple file systems) and serves client-initiated read and write requests. In at least one embodiment the storage manager 460 implements the volumes/regions/extents/slabs based storage techniques introduced here. The RAID system module 480 manages the storage and retrieval of information to and from the volumes/disks in accordance with a RAID redundancy protocol, such as RAID-4, RAID-5, RAID-DP or declustered RAID (discussed below), while the disk driver system 490 implements a disk access protocol such as Serial ATA (SATA), SCSI or FC protocol (FCP).

The backend server 465 also includes a CF interface module 440b to implement intra-cluster communication 470 with N-modules and/or other D-modules. The CF interface modules 440a and 440b can cooperate to provide a single file system image across all D-modules 216 in the cluster. Thus, any network port of an N-module 214 that receives a client request can access any data container within the single file system image located on any D-module 216 of the cluster.

The CF interface modules 440 implement the CF protocol to communicate file system commands among the modules of cluster over the cluster switching fabric 210 (FIG. 2). Such communication can be effected by a D-module exposing a CF application programming interface (API) to which an N-module (or another D-module) issues calls. To that end, a CF interface module 440 can be organized as a CF encoder/decoder. The CF encoder of, e.g., CF interface 440a on N-module 214 can encapsulate a CF message as (i) a local procedure call (LPC) when communicating a file system command to a D-module 216 residing on the same node or (ii) a remote procedure call (RPC) when communicating the command to a D-module residing on a remote node of the cluster. In either case, the CF decoder of CF interface 440b on D-module 216 de-encapsulates the CF message and processes the file system command.

In operation of a node 208, a request from a client 204 can be forwarded as a packet over the network 206 and onto the node 208, where it is received at the network adapter 340 (FIG. 3). A network driver of layer 412 processes the packet and, if appropriate, passes it on to a network protocol and file access layer for additional processing prior to forwarding to the storage manager 460. At that point, the storage manager 460 interprets the request and generates operations to load (retrieve) the requested data from the RAID system 480 if it is not resident in memory 320. The storage manager 460 determines in which extent and in which region the data resides. The region receives a request for that (portion of) extent and in turn determines the slab(s) containing the requested data. The request is then handed to the RAID system module 480 for further processing and the determination of which storage device(s) hold the data, before issuing requests to the appropriate storage device driver(s). The storage device driver(s) access(es) the data from the specified device(s) and loads the requested data block(s) in memory for processing by the node. Upon completion of the request, the node (and operating system) returns a reply to the client 204 over the network 206.

The data request/response "path" through the storage operating system 330 as described above can be implemented in general-purpose programmable hardware executing the storage operating system 330 as software or firmware. Alternatively, it can be implemented entirely or partially in specially designed hardware. That is, in an alternate embodiment of the invention, some or all of the storage operating system 330 is implemented as logic circuitry embodied within, for example, one or more field programmable gate arrays (FPGAs), application specific integrated circuits (ASICs), programmable logic devices (PLDs), or some combination thereof.

The N-module 214 and D-module 216 each can be implemented as processing hardware configured by separately-scheduled processes of storage operating system 330; however, in an alternate embodiment, the modules may be implemented as processing hardware configured by code within a single operating system process. Communication between an N-module 214 and a D-module 216 is thus illustratively effected through the use of message passing between the modules although, in the case of remote communication between an N-module and D-module of different nodes, such message passing occurs over the cluster switching fabric 210. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF API.

III. System Internal Functionality and Architecture

Figure 5:
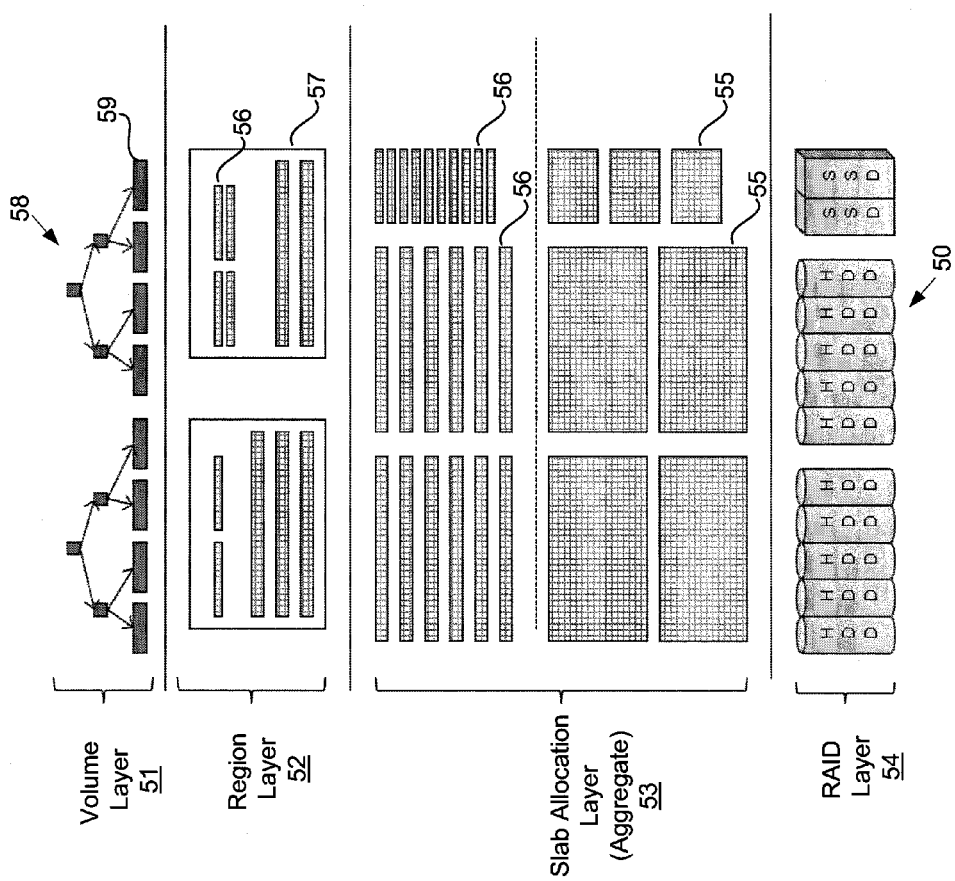
FIG. 5 shows various layers of data storage in accordance with the technique introduced here.

The system introduced here includes a file system and layout engine. As shown in FIG. 5, the system provides several distinct data layers, including: an aggregate layer (also called "slab allocation layer") 53 which sits on top of the RAID layer 54; a region layer 52 which sits on top of the aggregate layer 53; and a volume layer (also called "file system layer") 51 which sits on top of the region layer 52. In one embodiment, these layers are implemented by the storage manager 460 (FIG. 4) in the D-module 216 of each node 208 in a storage cluster, as discussed further below.

The system divides RAID parity groups 50 into two-dimensional arrays 55 of data blocks and then further divides up those arrays into "slabs" 56. Slabs 56 can be defined along RAID stripe boundaries. The block arrays 55 and slabs 56 are contained within the aggregate layer 53. The system further defines multiple "regions" 57 to contain data in the region layer 52. Each region can include one or more logical extents 59 (not shown in the region layer 52 in FIG. 6, for simplicity). Allocated to each extent 59 is at least a portion of one or more slabs 56 that are allocated to the region that includes the extent.

The system also maintains multiple volumes 58, or file systems, as logical containers of data in the volume layer. Each volume 58 includes one or more of the logical extents 59 from one or more of the regions 57. Notably, the region layer 52 hides the layouts of the logical extents within the various regions 57 from the volume layer 51 (and therefore, from the clients and users).

The various slabs 56 can be defined from a heterogeneous pool of physical storage devices, and any given region 57 can include extents built from slabs of two or more different types of physical storage device, such as flash memory, solid-state drives (SSDs), HDDs, etc.

Figure 6:
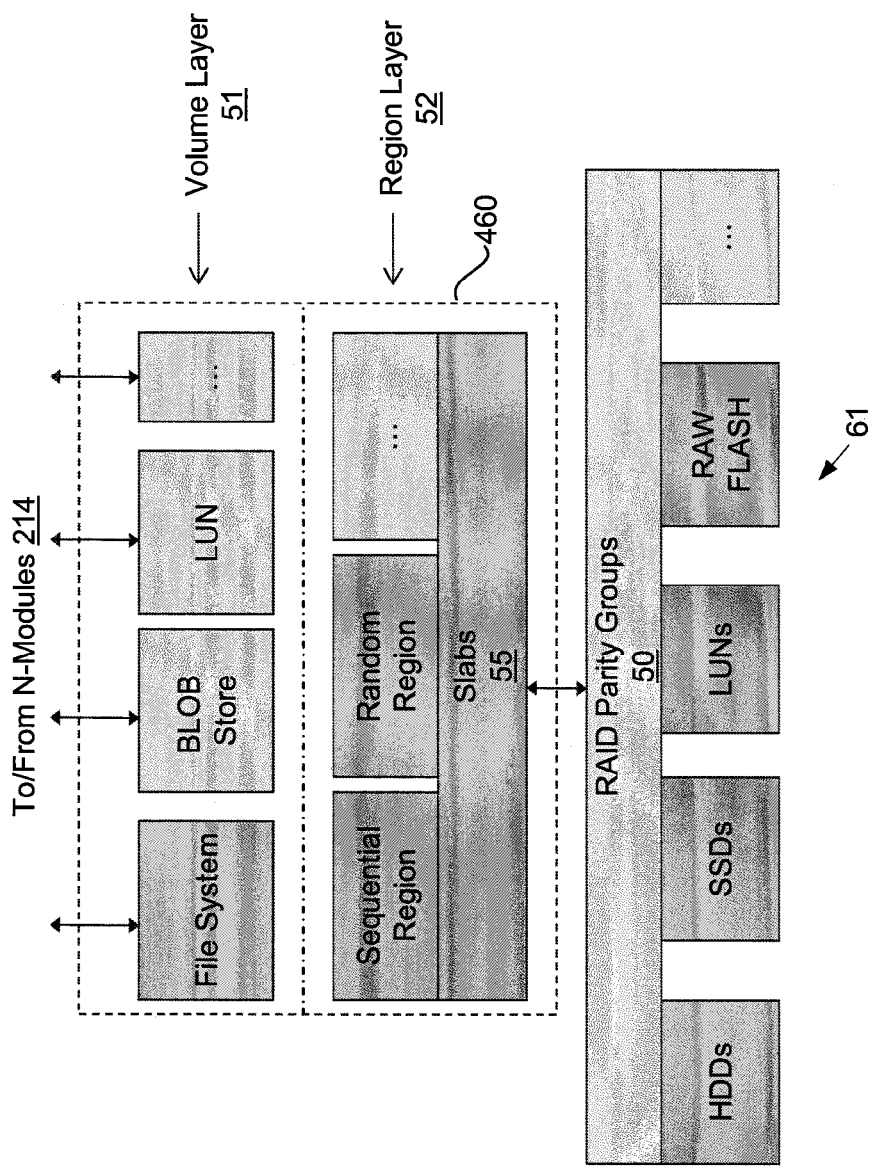
FIG. 6 illustrates an example of particular types of data layers.

FIG. 6 illustrates an example of particular types of data layers. The region layer 52 can include, for example, a sequential access region, a random access region, and one or more regions of various other types/purposes. The volume layer 51 can include, for example, a conventional file system, a binary large object (BLOB) store, a LUN and one or more volumes of various other types/purposes. Also as shown in FIG. 6, the physical storage devices 61 from which the slabs are obtained can include, for example, HDDs, SSDs, foreign LUNs, raw flash, etc. A "foreign LUN" is any LUN provided by a storage system or device that is: 1) not from the manufacturer of the storage server (or storage server node) with which it is used, and 2) not specifically designed or configured for use with the storage server (or storage server node) with which it is used. This is as opposed to a "native LUN", which is a LUN provided by a storage system or device that is: 1) from the same manufacturer as that of the storage server (or storage server node) with which it is used, or 2) specifically designed or configured for use with the storage server (or storage server node) with which it is used. It can be assumed that all persistent storage that is part of an aggregate of the system will be presented through RAID, if only to unify the naming and ownership properties of these devices.

Figure 7:
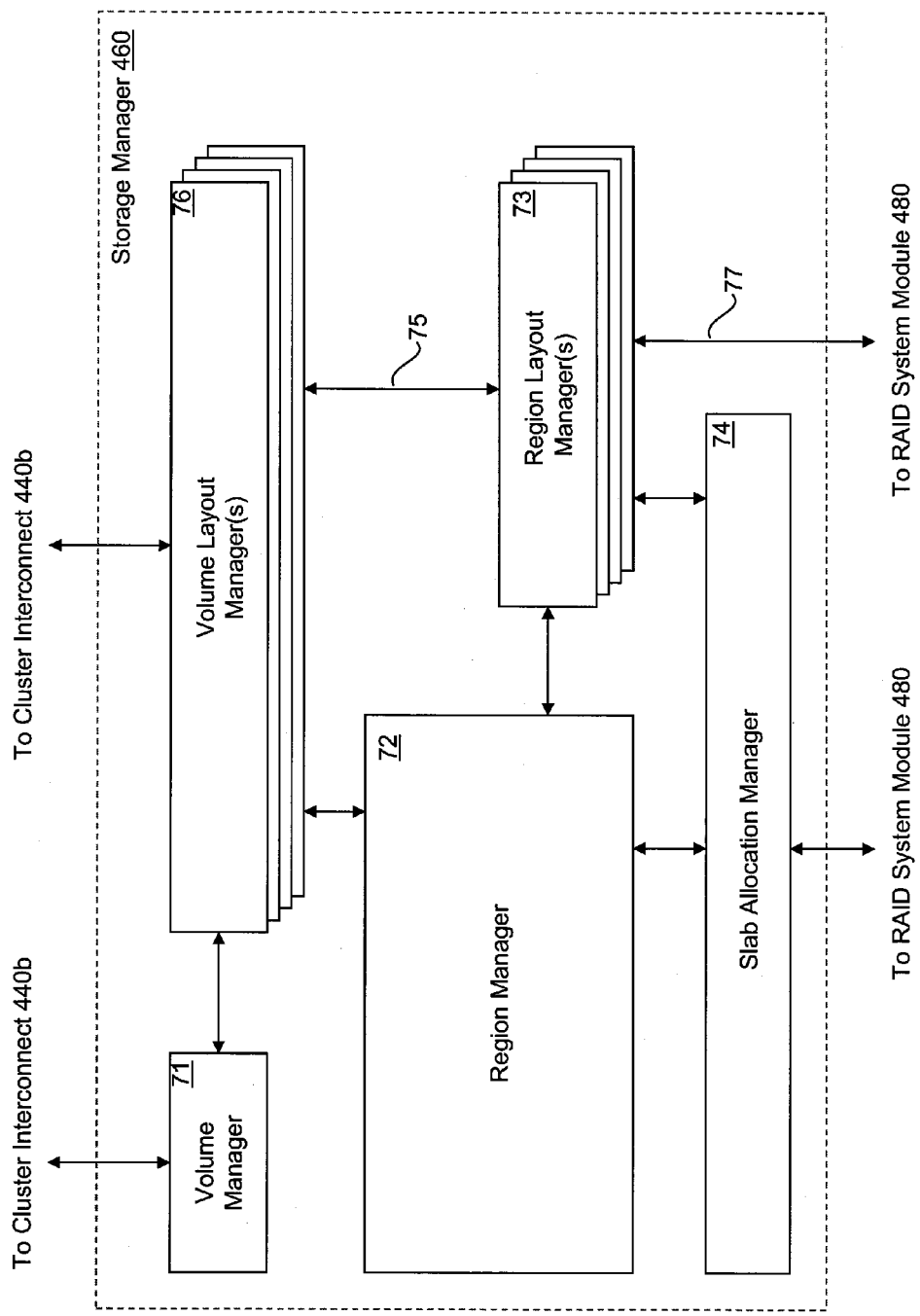
FIG. 7 illustrates the details of the storage manager, according to one embodiment.

FIG. 7 illustrates the details of the storage manager 460, according to one embodiment. In the illustrated embodiment, the storage manager for 60 includes a volume manager 71, one or more volume layout managers 76, a region manager 72, one or more region layout managers 73, a slab manager 74, a regions/extents interface 75 and a block I/O interface 77.

The volume layer 51 is created and managed by the volume manager 71. The volume manager 71 handles the creation and deletion of volumes. The storage manager 460 includes a volume layout manager 76 for each type of volume in the volume layer 51. Each volume layout manager 76 implements the internal organization of the corresponding volume type and is responsible for assembling externally visible data objects (e.g., files or LUNs) from extents. It also implements whatever naming scheme is appropriate for the volumes' objects (e.g., hierarchical pathnames for traditional file systems, LUN IDs for a LUN volume, etc.).

Below the volume manager 71 are a region manager 72 and a region layout manager 73, which provide and manage regions. The region manager 72 manages the overall population of regions associated with the storage manager 460. It decides on the assignment of individual extents to a suitable region (e.g., one that includes slabs of physical storage of particular characteristics). The region manager 72 also decides when new regions are needed and what type(s) they should be, and it creates them. It also monitors size and free space of regions. For example, the region manager 72 might decide that a region has grown too large and split it into two smaller regions, or it might ask a region with a lot of free space to return one or more slabs to the slab allocation manager 74. When the volume layer 51 needs to create new extents, the region manager 72 decides in which region(s) to place the extents.

The storage manager 460 creates a separate region layout manager 73 for each region in the region layer 52. Each region layout manager 73 is responsible for managing the internal functionality of the corresponding region, and in particular, for determining the actual physical placement of data within the region. More specifically, a region layout manager 73 determines the allocation of the individual extents to the physical storage blocks within the slabs that make up the corresponding region (i.e., it makes layout decisions for the extents stored in the region corresponding). Each region layout manager 73 also manages and determines format and storage locations for its region-internal metadata. Each region layout manager 73 provides a block I/O interface 77 to the RAID layer.

The region/extents interface 75 provides communication between the volume manager 71 on one hand and the region manager 72 and region layout manager 73 on the other hand. The slab allocation manager 74 sits below the region manager 72 and region layout manager 73 and above the RAID system module 480 (which implements the RAID layer) and is responsible for creating and allocating slabs. The slab allocation manager 74 allocates slabs in response to requests from region layout managers 73. It has the global knowledge of how many slabs of each type exist, and it can inform the region manager 72 when it is low on a particular type of slab, causing the region manager 72 to identify regions that are underutilizing (and can therefore release) slabs of that type. The slab allocation manager 74 requests parity groups from the RAID system module 480, from which it carves out slabs.

Figure 8:
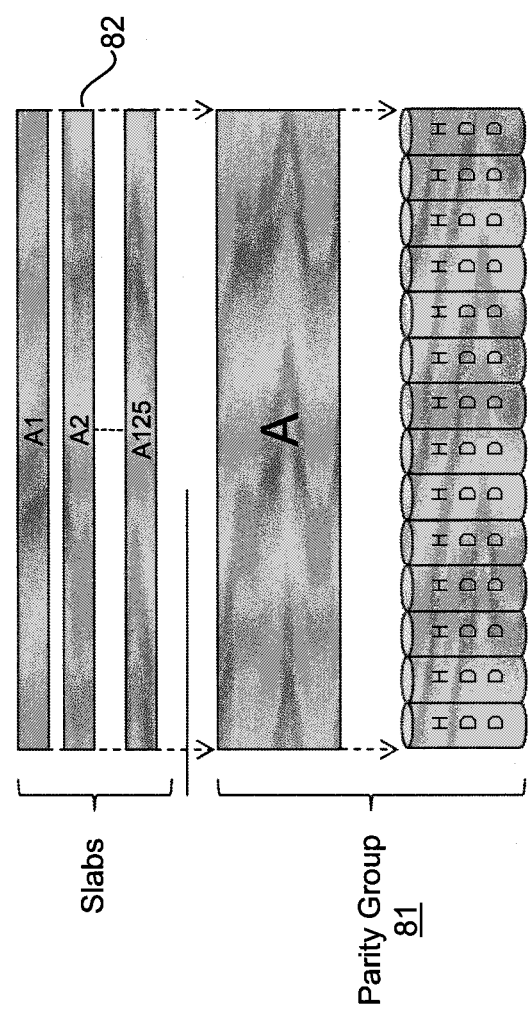
FIG. 8 illustrates how a RAID parity group can be cut into slabs.

In one embodiment, the RAID layer is implemented as "declustered" RAID. Declustered RAID is a RAID implementation that slices individual physical devices in the heterogeneous pool into "slices" and then assembles the slices from different devices typically, but not always, of the same characteristics into parity groups. The size of the parity groups are not tied to the physical size of the storage devices in the pool. In one illustrative embodiment, the slices are approximately 500 MB in size and, as shown in FIG. 8, there are 14 slices in a parity group. Each parity group thus consists of many data/metadata blocks. FIG. 8 shows a parity group 81 of 14 disk slices (e.g., 500 MB each) cut into 125 slabs 82 (e.g., 14×1024 4-KB blocks). Since SSDs are usually smaller and the system will normally have fewer of them, the SSD slices typically will be smaller and the associated parity groups will contain fewer slices.

The RAID layer groups a heterogeneous collection of parity groups into a system aggregate. The system views these parity groups as two-dimensional arrays of blocks of storage (in contrast with at least one known conventional file system, which views its storage as a single large "volume block number (VBN) space" and only concerns itself with RAID groups transiently during write allocation). As an example, a 100 TB aggregate might contain 13,000 HDD parity groups and 1,000 SSD parity groups. The relatively modest size and resulting large numbers of parity groups is a facet of the declustered RAID design; parity groups are kept small since they are the unit of allocation to aggregates.

Above the parity groups, the slab allocation layer 53 takes the two-dimensional arrays of blocks and carves them along stripe boundaries into many much smaller slabs of storage. The number of stripes in a slab is related to the underlying physical storage type; for example, HDD slabs may be at least few tracks long, while SSD slabs may be at least an erase block long. At the same time, slabs are kept relatively small because they are the basic unit of space allocation to the next higher level in the system, i.e., the regions.

A region is not a fixed geographical region in the parity groups but is a virtualized container stored in a varied collection of slabs. A region holds logical (virtualized) extents of data. Each extent is simply a range of bytes of data or metadata stored in a region and accessed via an extent identifier (ID). Reference counts for extents are maintained within the region, allowing for external sharing of extents. The layout and location of an extent within a region is hidden from the users of the extent (i.e., from volumes, clients, end users).

The virtualization of extents within regions is an architectural advantage for the system. Traditional file systems manage the performance, space efficiency and reliability of an extent of data through direct control of the layout of the data. In the system introduced here, expectations are expressed through the SLO of an extent. A region completely hides the details of the location of the data and how the SLO is honored. This gives the region the latitude to implement algorithms such as compression or storing very similar extents together, sharing most of their data blocks and the few divergences.

Figure 9:
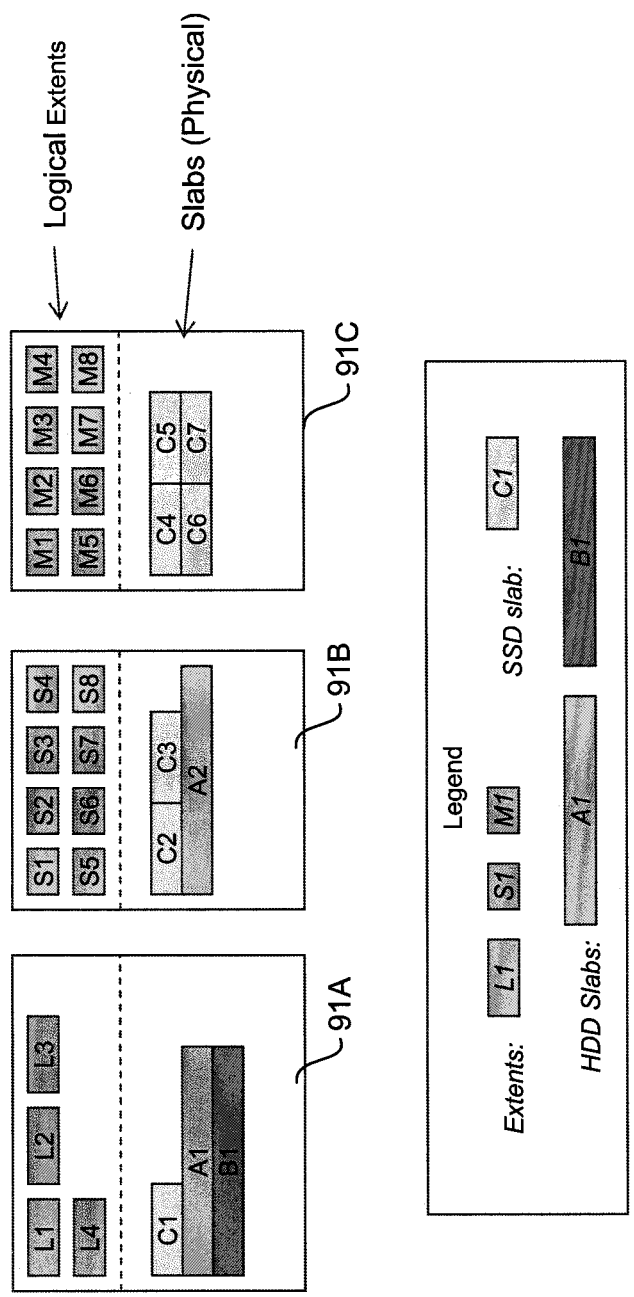
FIG. 9 illustrates an example of the layering within regions which include extents.

The isolation of the internal structure of regions allows for the implementation of multiple internal region layout manager entities which optimize the organization of the internals of the region for specific workloads. Different regions can be optimized for different purposes, including different internal layouts and algorithms as well as dynamically shifting mixes of underlying storage. Extents with very different SLOs can be stored in different regions. For example, in FIG. 9 there are shown three types of extents, namely, LUN data ("L"), small file data ("S") and metadata ("M"). These three types of extents are stored in three specialized regions, 91A, 91B and 91C, each with its own internal format to map each extent ID to its storage. The different regions 91A, 91B and 91C are also using different mixes of storage slabs, as dictated by their need to satisfy the SLOs on their extents.

Figure 10:
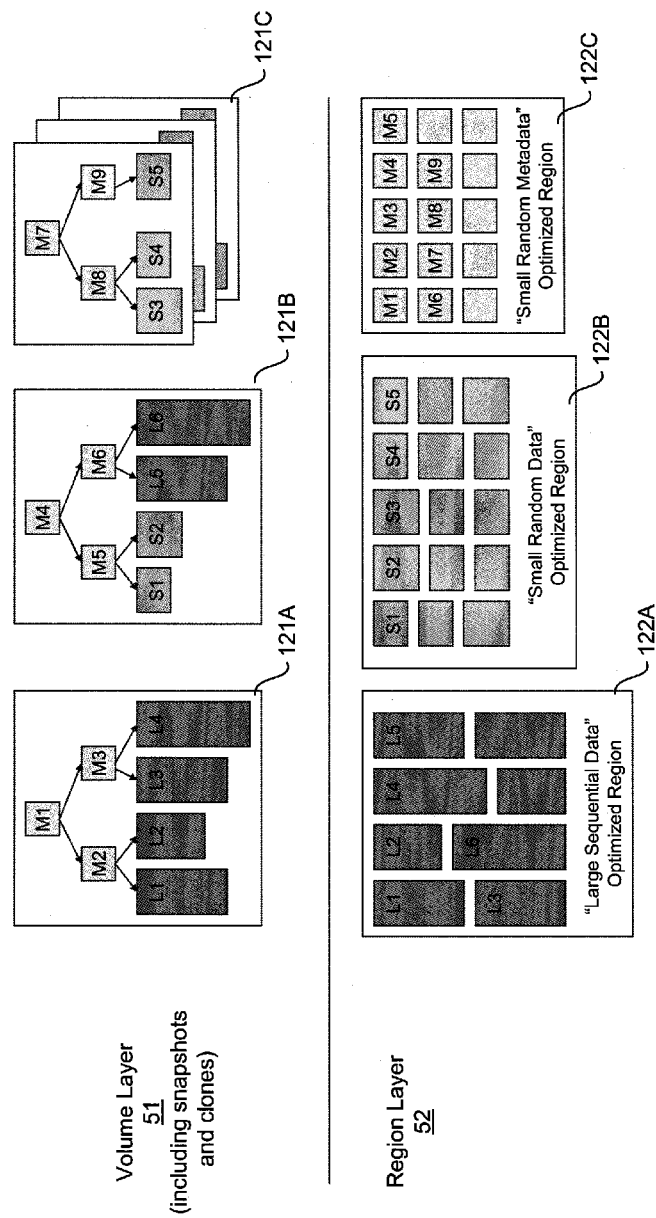
FIG. 10 illustrates how volumes can be represented as trees of extents that are contained within regions.

The top layer of the system is the volume layer 51. As shown in FIG. 10, volumes can be structured as trees of variably sized extents. Bottom-level extents hold the data of the volume, while higher-level extents store the metadata that organizes the lower-level extents. In the example of FIG. 10, three volumes, 121A, 121B and 121C, in an aggregate are each made up of a tree of extents, where the extents are maintained in three separate regions, 122A, 122B and 122C. Each volume contains data as well as metadata. Further, it can be seen that volume 121B includes two different classes of data, as well as metadata. The different classes of data and the metadata have different SLOs and so are stored in different types of regions. Administrators can express their preferences for data sets through options in data management software (the details of which are not germane to the techniques introduced here). These preferences are translated into objectives (expectations) on the particular volumes 121A, 121B and 121C and data objects within them and eventually to objectives on the different data and metadata extents. At the region level 52, all objectives with regard to the performance, space efficiency and reliability of the extents are conveyed through the SLO of the extent.

Referring again to FIG. 6, the system allows for different volume types. In the case of a traditional file system type volume, data accesses are carried out through directories and files. All data and metadata is stored in files, and each file is a tree of extents rooted at the file's inode (primary metadata container). The inode itself can be stored in the data extents of a separate inode file.

The SLOs of metadata allow a volume to specially treat high level metadata, such as volume-level metadata blocks. The system can store the high level metadata needed to boot the aggregate in special purpose regions, allowing rapid boot, takeover and high-level repair. By storing critical metadata in storage with a high-level RAID redundancy, the system can reduce the exposure to repair related downtime.

In addition, reference counting of extents (i.e., maintaining a count of the number of references to each extent) allows files in the aggregate to share the same data. Reference counting of extents forms the basis of high-level deduplication; two files from separate volumes that have the same data can each point at a shared extent. Reference counting also serves as the basis for creating and managing clones and snapshots (read-only clones). Cloning a volume can be done by incrementing the reference count on the top level extent. As changes occur in the shared extents below, the extent trees diverge, pushing the sharing down deeper in the tree of extents. Similarly to cloning a volume, an individual file can be cloned by copying the inode and incrementing the reference count on the top level extents.

Figure 11:
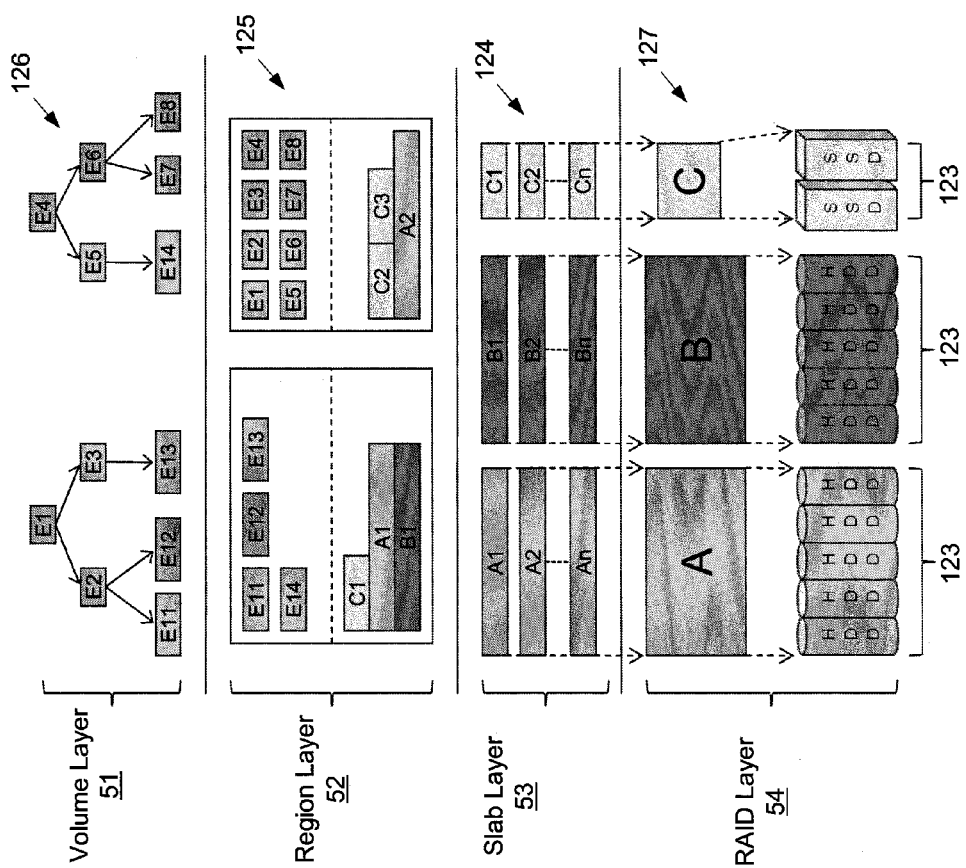
FIG. 11 illustrates an example of the various data layers from the volume level down to the RAID level.

An example of putting all of these layers together is illustrated in FIG. 11. The RAID system module 480 has assembled slices of HDDs and SSDs into virtualized RAID groups and assembled those RAID groups into an aggregate. The slab allocation layer 53 sees these parity groups as large arrays 127 of blocks, which it cuts into slabs. Hence, the system has sliced the parity groups 123 into slabs 124 and allocated some of those slabs 124 into two regions 125. The two regions 125 are holding different classes of data (extents) from the two volumes 126 above them. Finally, the data in the volumes 126 is exported through the CF interface 440b (FIG. 4).

The access path to a data container can be similar to that in a conventional file system. For example, each container can be identified in the storage cluster by its unique ID. The N-modules 214 route data to the appropriate D-module 216 using the container's unique ID stored in a system-wide map (e.g., the VLDB).

Figure 12:
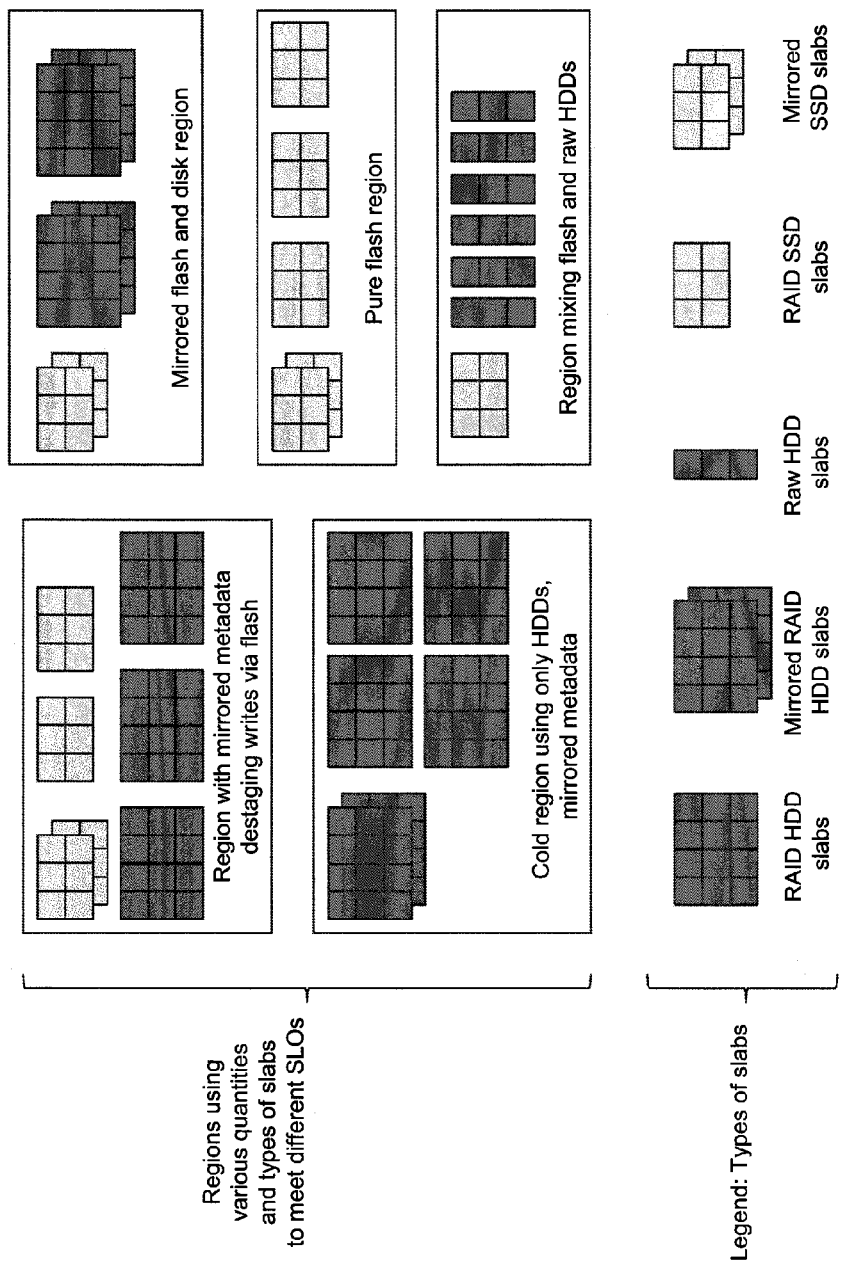
FIG. 12 illustrates an example of how various different types of slabs can be owned by different regions.

FIG. 12 shows another example of how different types of slabs can be owned by different types of regions. This example uses several different types of slabs, including RAID HDD slabs, mirrored RAID HDD slabs, raw HDD slabs, RAID SSD slabs and mirrored SSD slabs. These slabs are distributed among several different types of regions, including: a region with mirrored metadata which destages writes via flash; a "cold" region (for infrequently accessed data) which uses only HDDs and mirrored metadata; a mirrored flash and disk region; a pure flash region; and a region mixing flash and raw HDDs.

IV. RAID/Storage Manager Interface

In one embodiment, the RAID layer (or more precisely, the RAID system module 480) communicates a list of its parity groups to the storage manager 460. For each parity group, the RAID layer informs the storage manager 460 of the parity groups' width, i.e., the number of slices mapped to different devices that can hold data, number of blocks, block size, type of physical device (e.g., HDD, SSD) and potentially subtypes (e.g., RPM, inside tracks, etc.). Since there are generally massive commonalities between parity groups within a RAID group or aggregate, this can be achieved with a single type field and a table lookup. The system can tag blocks written to RAID with the triplet (parity group ID, slice number, block offset).

V. Slabs

As described above, the slab allocation layer 53 takes the parity groups supplied by RAID and carves them into slabs which are smaller subarrays of blocks allocated from the parity group's larger array. Slabs inherit their performance and reliability traits from their parity group. They are allocated as a range of parity stripes, so the width of all slabs on a parity group is uniform within the group. The degree of freedom in slab allocation is the number of stripes in the slab. Slabs can be created in a range of standard sizes and can be subdivided or combined as needed. On spinning media (e.g., HDDs), a minimum slab length may be chosen to approximate a small multiple of track size, while on SSDs or storage attached flash the minimum slab length may be an erase block, for example.

The slab allocation layer 53 maintains free pools of slabs of given geometries, performance and reliability. Regions that require storage are allocated slabs from the free pool. Periodically the slab allocation layer 53 finds regions that have underutilized slabs and prompts them to return slabs to the aggregate. A region may be chosen based on its free space related to its SLOs or due to perceived "coldness" of its data, allowing a shift from performance to space efficiency (in accord with its SLO).

In addition to allocating and freeing slabs to and from regions, the slab allocation layer 53 can exchange slabs with a region. The slab replaced need not have the same geometry as the slab being replaced. Slabs of the same geometry may be exchanged because the slab the region owned was somehow special, for example, the slab may be part of a parity group the slab allocation layer 53 wants to return to RAID. The slab allocation layer 53 can exchange a smaller slab for a larger, partially used slab.

VI. Regions

Regions are virtual (logical) storage containers that use a collection of slabs to hold logical extents of reference counted data. A region will "know" at least some physical characteristics of each slab that is allocated to it, including:

How efficient that type of slab is for sequential and random I/O (this is one way the system can distinguish flash from HDD).

Ideal I/O size (e.g., for disk slabs the underlying disks' track size)

Parallelism, i.e., the number of distinct devices making up the slab. For RAID this will be the number of data drives.

Within a region, each slab is divided into pieces of the ideal I/O size, which are called "chunks". So for HDD slabs, one chunk can be one disk track.

In one embodiment, all accesses to regions are done through the region ID and extent IDs. The region maintains its own internal state which tells it how to map extent IDs to actual data within the region's slabs. The precise details of this mapping and other internal "bookkeeping" can vary greatly between different types of regions. In one embodiment, the mapping from extent IDs to actual data for region and the internal metadata for the region are stored on a small amount of flash memory defined within the region.

VII. Extents

A file (within a volume) is made up of one or more extents, which are contained within one or more different regions. An extent is a logical piece of data. Different extents can be of different sizes. In one embodiment, extents can be relatively large, e.g., on the order of many tens of MB. Each extent can be identified by a pointer comprising the tuple (region ID, extent ID). For each extent, the region also stores an "extent descriptor," which is a collection of metadata about the extent (similar to an inode). The extent descriptor will keep information such as the extent's size, when it was created, and its SLO. The extent descriptor is also used by the region layout manager 73 to translate from logical addresses in the extent to physical addresses in the storage managed by the region. This can be done by using a buffer tree similar to that used by conventional block-oriented file systems.

Figure 13:
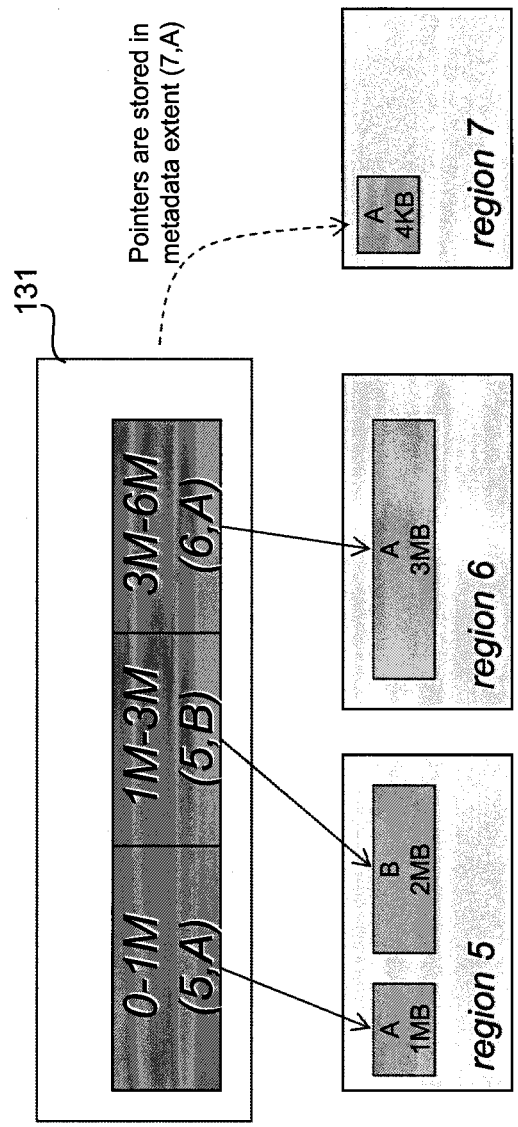
FIG. 13 illustrates an example of how file can be made up of extents.

As shown in FIG. 13, an illustrative file 131 includes three extents, namely, extents (5,A), (5,B) and (6,A), i.e., extent A in region 5, extent B in region 5, and extent A in region 6. The file 131 also stores various pointers in a metadata extent (7,A), i.e., extent A in region 7.

Generally a region holds the data for its extents. An exception is that a region can instead hold forwarding information for extents. Since one of the key goals is easy data movement, the system supports moving extents or parts of extents between regions. In addition, maintaining manageable region size may occasionally require splitting regions, sending extents or parts of extents to other regions. Since an extent can only directly reference data within its own region, cross-region data movement can be supported through forwarding pointers.

When the system moves an extent to another region, it leaves a forwarding pointer behind at the old extent ID. Any operation that accesses the extent may receive a failure notification and forwarding information instead. The forwarding information allows the volume to find the new location of the data and update its pointers to the new location. An advantage of this approach is that the forwarding information is contained within the region's metadata, avoiding expensive random disk accesses to detect forwarding. During the move, the extent may have been split into two extents. In that case the forwarding information will include pointers to two or more extents. Note that extent forwarding is probably a less common version of data movement than data movement within a region.

Figure 14:
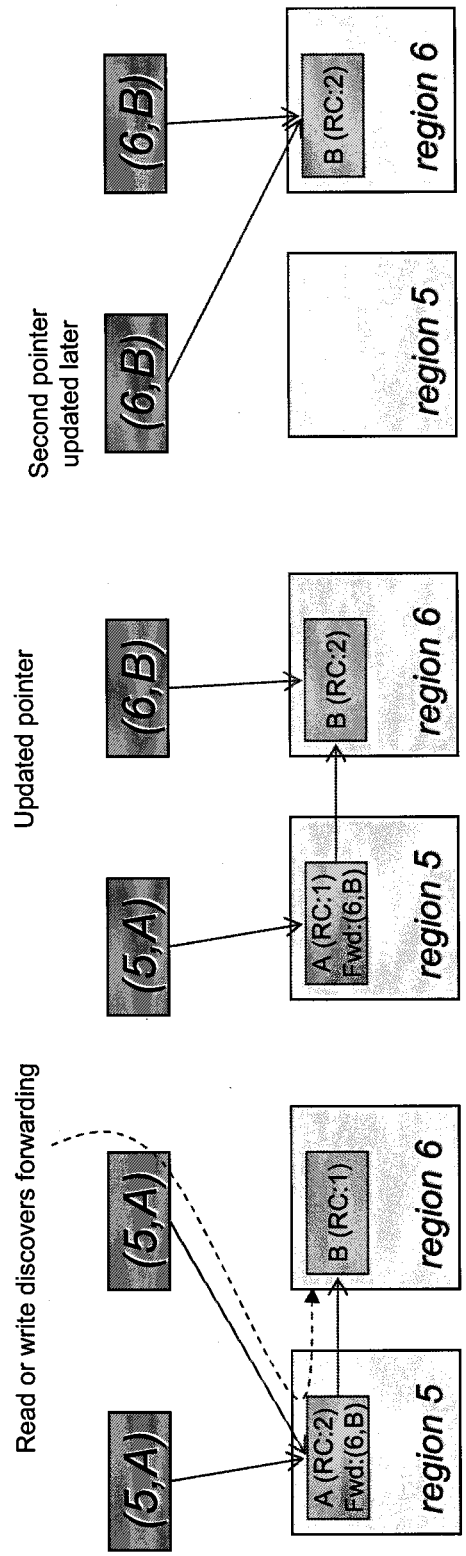
FIG. 14 illustrates an example of extent forwarding.

FIG. 14 shows an example of extent forwarding from one region to another. Two separate files are initially using the same extent (5,A), i.e., extent A in region 5, which is then moved from region 5 to region 6. When the extent is moved, a forwarding extent entry is left behind. Since there are still two files pointing to the old entry, it has a reference count of 2, and the only reference to the actual data is the forwarding entry. Reading through one of the files will discover the forwarding. The containing volume can still read the data and move that file's pointer to the new location. Later a separate access can move the other pointer, freeing the forwarding pointer.

The operations in the primary data path for a region include creating extents, incrementing and decrementing the reference counts on existing extents, and reading and writing in extents. Creation of an extent, with or without data, creates an extent of a requested length within a region. The call for this operation includes the required SLO of the extent. The region creates the extent and returns an extent ID. Alternatively, the region can refuse to create the extent, for example, due to the SLO or space considerations.

Reading from an extent passes an extent ID and an offset and range within the extent. The read returns the pointer to buffer(s) holding the extent data. A write to an existing extent changes the data in the extent, possibly filling a hole.

Figure 15:
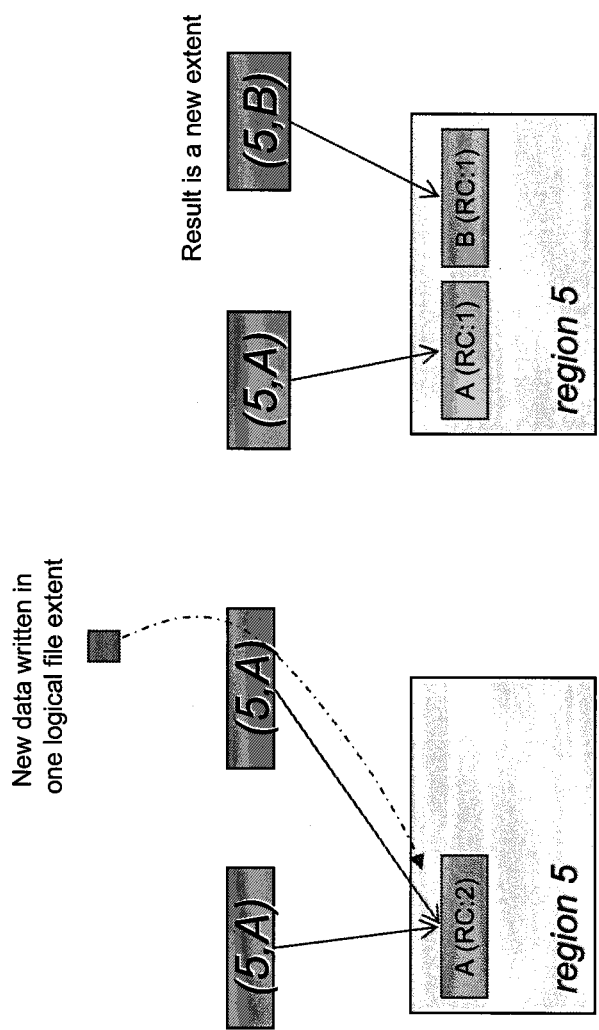
FIG. 15 illustrates an example of an overwrite to a shared extent in a file.

An overwrite of an extent through one reference to a shared extent does not modify the data accessed through other reference(s). Consequently, a write to an extent with a reference count higher than 1 will force a divergence and the writing entity (e.g., the volume) will receive a new extent as a result. This scenario is illustrated in FIG. 15, where two files each have a pointer to extent (5,A). The extent has a reference count of 2. Since the extent is shared, the overwrite in the middle of one of the references cannot change the extent; rather, it creates a new extent. The internal storage details of the region are not shown here; it is possible that extents (5,A) and (5,B) share most of their physical storage within the region.

Incrementing the reference count on an extent is done when the containing volume wants to use a second reference to the extent, as might occur in snapshotting, cloning or deduplication. The holder of one reference to an extent is not allowed to change the data seen by another holder of the extent. The increment operation can fail due to the reference count on the extent being too high or because of the extent having been split or moved. Failure due to splitting or moving can be overridden, in which case a new reference is created to the forwarding information.

Decrementing a reference count succeeds unless the extent does not exist. If the reference count is decremented to 0, the extent is removed. Note that the region does not know the context of the information inside the extent. Management of "side effects", such as decrementing references on child extents, is managed by the volume. If the extent has been moved, the decrement will still succeed, but in this case it will decrement the reference count on the forwarding information, eventually deleting the forwarding information when all links to it have been removed.

A related operation to incrementing the reference count is cloning an extent. Extent cloning takes an extent pointer and creates a new extent that shares all or part of the existing data of the original extent. It is possible that the region will implement the two extents by sharing storage. This is useful for deduplication or when the new copy of the extent needs a different SLO. This operation can fail due to space considerations or due to the new SLO.

VIII. Chunks and Allocation Ranges

Figure 16:
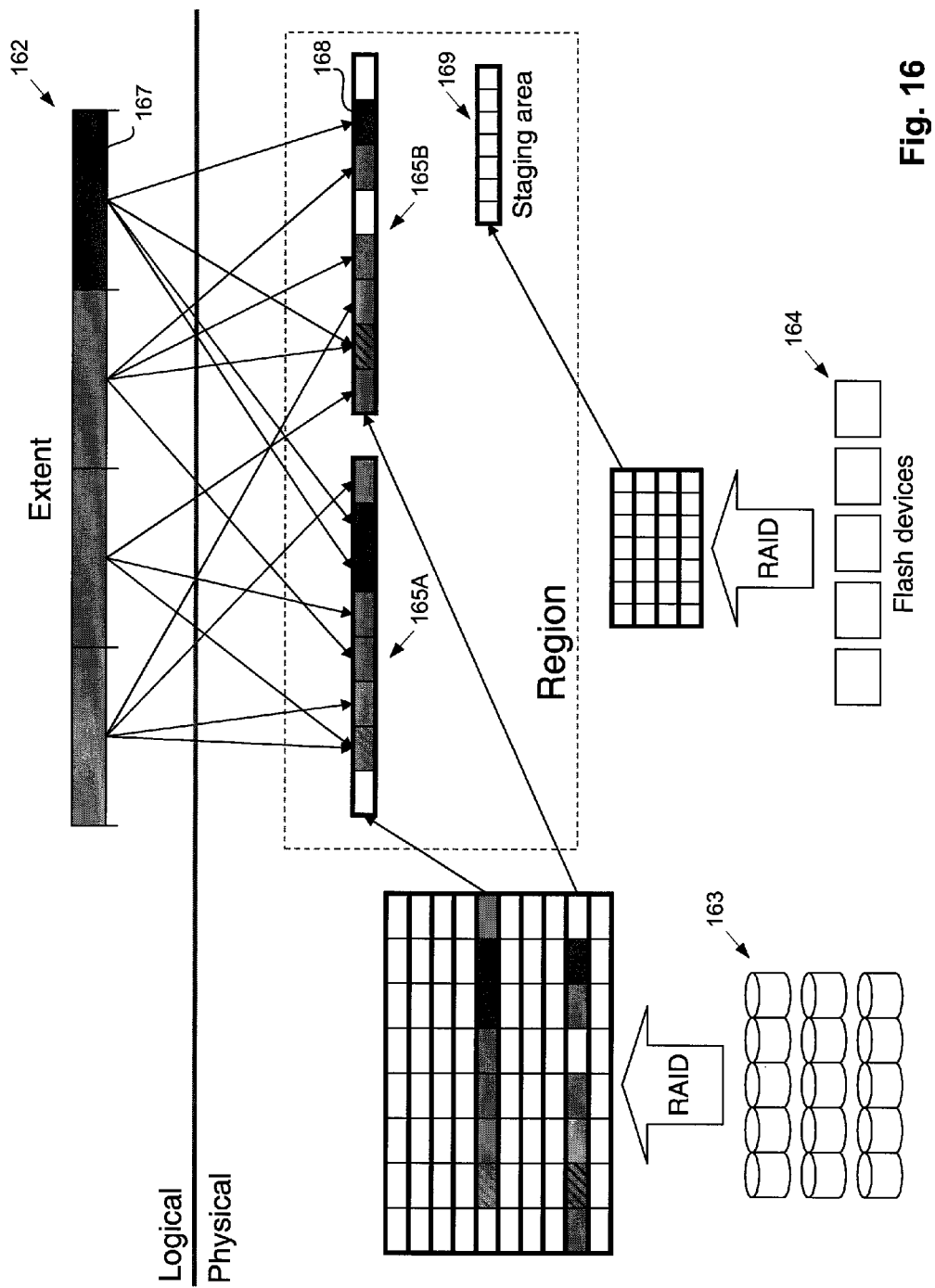
FIG. 16 illustrates the division of an extent into allocation ranges and chunks.

In one embodiment, the system further divides extents into "allocation ranges" and "chunks". FIG. 16 illustrates an example of the relationships between these various types of data units. The solid horizontal line 161 divides the figure into logical objects above and physical objects below. Above the line 161 is shown a single illustrative extent 162. The extent 162 is divided into four allocation ranges 167. The extent 162 could be, for example, an 8 MB extent that is divided into 2 MB allocation ranges.

Below the line 161 are the physical devices, e.g., HDDs 163 and flash devices 164. These are combined, via RAID, to create an array of physical block addresses. This physical address space is divided into slabs 165A, 165B. Each slab is then sub-divided into chunks 168.

Shown inside the dashed box are some of the resources that belong to a particular region. There are two disk slabs 165A, 165B where data "resides" and a staging area 169, which can be or include, for example, a flash slab where small changes are accumulated before writing them to a disk slab.

The arrows crossing the logical/physical line 161 show an illustrative mapping between allocation ranges 167 (logical objects) and chunks (physical objects) 168. Each allocation range 167 uses one or more chunks 168 to store its data. This is shown both by the arrows and the shading scheme. FIG. 16 also shows that different allocation ranges 167 can share chunks. This can occur either because the allocation ranges use different blocks from the same chunk or because there are shared blocks between the two allocation ranges.

Figure 17:
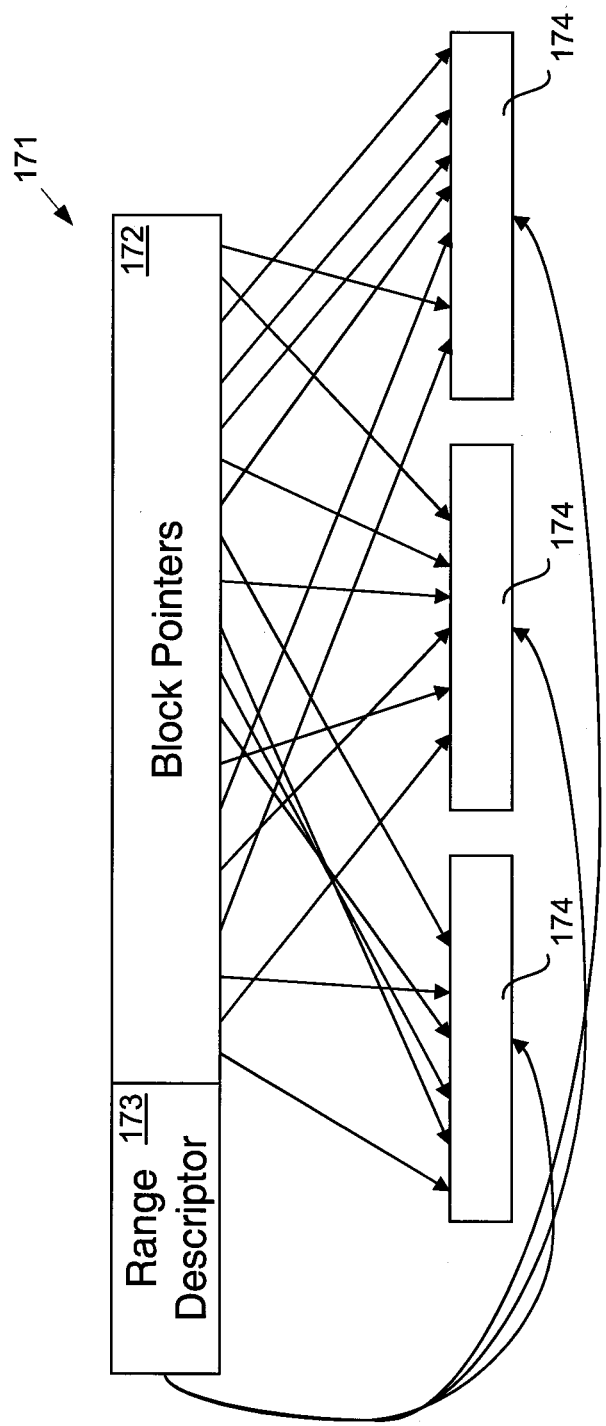
FIG. 17 illustrates an example of the mapping of a Level 1 (L1) block of an extent to corresponding chunks.

FIG. 17 shows an example of the mapping from chunks to allocation ranges. In one embodiment, each extent is represented as a tree of data/metadata blocks rooted at the extent's inode (similarly to how a file is represented as a tree of extents rooted at the file's inode). A Level-1 ("L1") indirect block is a block in the level immediately above the lowest ("leaf") level in the extent's tree. As shown in FIG. 17, an L1 block 171 contains pointers 172 to the actual data blocks (not shown) of an extent, which are also called the Level-0 ("L0") blocks and which are stored within the chunks 174 of the extent.

In one embodiment, the size of an allocation range is equal to the number of blocks that can be referenced from an L1 block in the extent's buffer tree. Such an embodiment is convenient, because it allows storage in the L1 block of metadata about the chunks used by the allocation range along with the pointers to the actual data (L0) blocks. In FIG. 17, this metadata is shown as a range descriptor 173 that points to the three chunks used by the allocation range. All of the block pointers in the range point to data blocks (not shown) within those three chunks.

The use of allocation ranges and chunks is discussed further below in the context of balancing performance with block sharing.

IX. SLOs and Balancing Performance with Block Sharing

As noted above, the system introduced here can dynamically and continually balance performance with block sharing. The major principle here is that, toward implementing a "service level storage system", the system can use SLOs to determine dynamically how much block sharing to do (e.g., for deduplication) and when to do it. In particular, SLOs allow the system make at least two types of better-informed decisions. First, if the system is performing deduplication and finds multiple instances of the same data block, it can use the SLOs of the files that use the block as a basis to determine whether it should eliminate one or more of the duplicate blocks. For example, it may eliminate a copy of a block only if the file(s) that use that copy can still meet their SLOs with the block in a different location. Second, when the system has blocks that are already shared—for example, a block that is commonly used across multiple clones—it can use SLOs as a basis to decide when/where it would be beneficial to make new copies of the block. For example, if one clone cannot meet its SLO with the existing copy of the block, the system can make a new copy of that block to let the clone meet its SLO.

Various existing storage systems provide block sharing, such as for purposes of deduplication, snapshots and clones. But while block sharing generally increases storage efficiency, it can adversely affect performance, especially for sequential I/O. By attaching SLOs to storage objects, therefore, the system introduced here enables a user (i.e., an administrator or application) to specify the trade-off between performance and space efficiency (e.g., via storage management software). At on extreme, a user might request, for example, "best performance" for a file, and in response the system would only do block sharing when such sharing would not interfere with performance. At the other extreme, a user might specify, for example, "best effort" performance for a file, which would allow the system to exploit as much block sharing as possible.

Interesting scenarios also exist between those two extremes. For example, given several related clones of a large file, a user might specify two clones that require good performance (however "good" may be defined), causing the system to break block sharing relations between those two clones to produce a layout that is more conducive to good performance (e.g., physically sequential blocks in storage). If the other clones do not need as good performance, the system could continue performing block sharing between those clones and the two clones that do require good performance. However, the system would make sure that the shared blocks were located in positions that are optimal for the clones that do require good performance.

A. Workloads

The following description generally pertains to regions that support LUN or database workloads. In these use cases, it is generally expected to have large extents (which are parts of even larger files). Such extents should support efficient access using both random and sequential access, for both reads and writes.

Efficient sequential I/O can be achieved by organizing logically sequential data sequentially (or nearly sequentially) on the physical storage. The system can provide efficient random write performance by collecting random write data in a persistent "staging area." The staging area can be, for example, flash memory. The system can provide efficient random read performance by placing extents with SLOs that require high random read performance in flash.

B. Block Reference Counts

Rather than a traditional allocation bitmap, which uses a single bit to indicate whether each physical disk block is free or in use, the system in one embodiment uses a per-block reference count (in addition to the extent reference counts mentioned above). The block reference count is the number of pointers to a block from all of the extents in a region.

C. SLOs

While many different characteristics can be captured in storage SLOs (e.g., latency, throughput, reliability, availability, etc.), to simplify description the following discussion will only consider sequential throughput. An SLO can be embodied as a key-value pair. SLOs can express throughput as a percentage of an ideal "maximum throughput", for example. Hence, if an extent (or file) has an SLO value of 50, the system would have to layout the extent on physical storage in such a way that the system could achieve at least 50% of the ideal throughput. Note that an SLO value of 0 in this context is permissible and means that the system need not make any guarantee about the available performance. For example, a user who cares more about space efficiency and deduplicating data as aggressively as possible would specify an SLO of 0. In one embodiment, therefore, an SLO only represents a lower bound on the layout of an extent, and the system always attempts to achieve layout as close as possible to "ideal," regardless of the SLO value.

One "ideal" layout is for an extent to be organized as full chunks (e.g., tracks) of data on disk. With such a layout, when the system reads an extent it can read (or write) a full track of data for each seek it performs to move between tracks, thereby amortizing the cost of the seek across a relatively large amount of data transfer.

D. Evaluating Extent Layouts

The system can dynamically determine whether the layout of any particular extent's blocks on physical storage is adequate to meet the extents SLO. To do this, the system considers each extent to be a sequence of allocation ranges, as discussed above regarding FIGS. 16 and 17. In one embodiment, if each allocation range within an extent has a layout that is sufficient to meet the extent's SLO, then the entire extent is considered to meet its SLO.

An allocation range is at least as big as a chunk, and in practice it may be most useful for it be several times larger than the chunk size. Allocation ranges represent sequential subsets of an extent.

In one embodiment the system evaluates the layout of an allocation range against an SLO by computing a "layout score" for the allocation range. Layout scores can be expressed in the same way as SLOs, e.g., as a percentage of the ideal throughput (or other criterion). The layout score for an allocation range can be defined to be the percentage of space that the allocation range occupies across all of the chunks it uses. For example, if the system has a 2 MB allocation range that has blocks allocated from five different 512 KB chunks, then the allocation range is using 80% of the space in its chunks (2 MB/(5*512 KB)=80%), and its layout score would therefore be 80. This score is good enough to satisfy any SLO up to 80. So in one embodiment, if an extent has an SLO of 80, all of its allocation ranges would need to have layout scores of at least 80.

There are other possible ways to express and use per-allocation-range layout scores to determine whether an entire extent meets its SLO. For example the system could accept any layout where the average layout score of all of the allocation ranges in an extent equals or exceeds the SLO.

In one embodiment, for purposes of evaluating layout scores the system ignores any blocks that belong to an allocation range and are stored in flash memory. Because of the high random I/O capabilities of flash memory, it is assumed that if it is necessary to do a large sequential read and a few of the needed blocks are in flash, there is no performance penalty to read those blocks. This means that any blocks in the flash-based staging area do not hurt the layout score of their extent.

Within an allocation range it does not matter how the blocks are allocated within the chunks. When the system is performing sequential I/O, it will typically be in large requests, so it will be efficient to simply read or write all of the chunks that belong to an allocation range and then sort out the blocks in memory. This takes advantage of the high throughput that disks can provide when reading or writing entire tracks of data.

One interesting simplification of the approach described here is to use an allocation range of exactly the same size as the chunk size. This simplifies some of the allocation decisions, as discussed below, however, it has the drawback that there is a very limited set of possible layout scores, i.e., only layout scores of 100/N, where N is the number of chunks used by the allocation range.

As noted above, in one embodiment an allocation range is equal to the number of blocks addressed from an L1 block in the extent's tree. This size is convenient because it permits storage of a range descriptor in each L1 block of the extent's tree along with the pointers to all of the blocks in the range. A downside to this approach, however, is that the range size may not be an even multiple of the chunk size, which would make it essentially impossible to meet an SLO of 100. For example, if there are 950 block pointers in an L1 block, then the range size would be 950 blocks. If the chunks are all 200 blocks, the best layout score that could be attained would be 95 (using 5 chunks for the 950 blocks).

E. Use Cases

When new data is written to an extent (which is a logical container of data), the system determines a physical location to store that data. The following discussion describes algorithms that can be used to accomplish this. Before considering those algorithms, however, it is useful to consider various possible use cases in which the algorithms may be employed.

Typically data will not stay in one place within the system. Over time the system will move (or reallocate) most data. There are a variety of reasons for doing this, such as achieving better extent layout, destaging data, deduplication and data migration. For example, if the system has an extent that does not meet its SLO, the system can move all or part of the extent's data to new locations that will provide the desired layout score.

As another example, the system can temporarily "stage" small updates in a (persistent) staging area, such as flash memory. Periodically the system will destage that data to regular storage. Flash memory is desirable for this purpose, since it has favorable random access characteristics. In principle the system could also use HDDs for a staging area, but that would make it harder to meet SLOs.

With regard to deduplication, when the system detects that multiple physical blocks hold the same data, it can collapse them to a smaller number of copies of the data. In some cases, it may make sense place a deduplicated block in a new location rather than reusing one of the existing copies.

Regarding data migration, changes in SLO may cause the system to move data from one storage location to another. For example, as a file falls into disuse, the user/administrator may decrease its SLO, in response to which the system may move the file's extents to lower-cost and lower-performing storage. Alternatively, as part of system repair or upgrade, it might become necessary to move data from old or degraded storage to newer devices.

F. Algorithms

Figure 18:
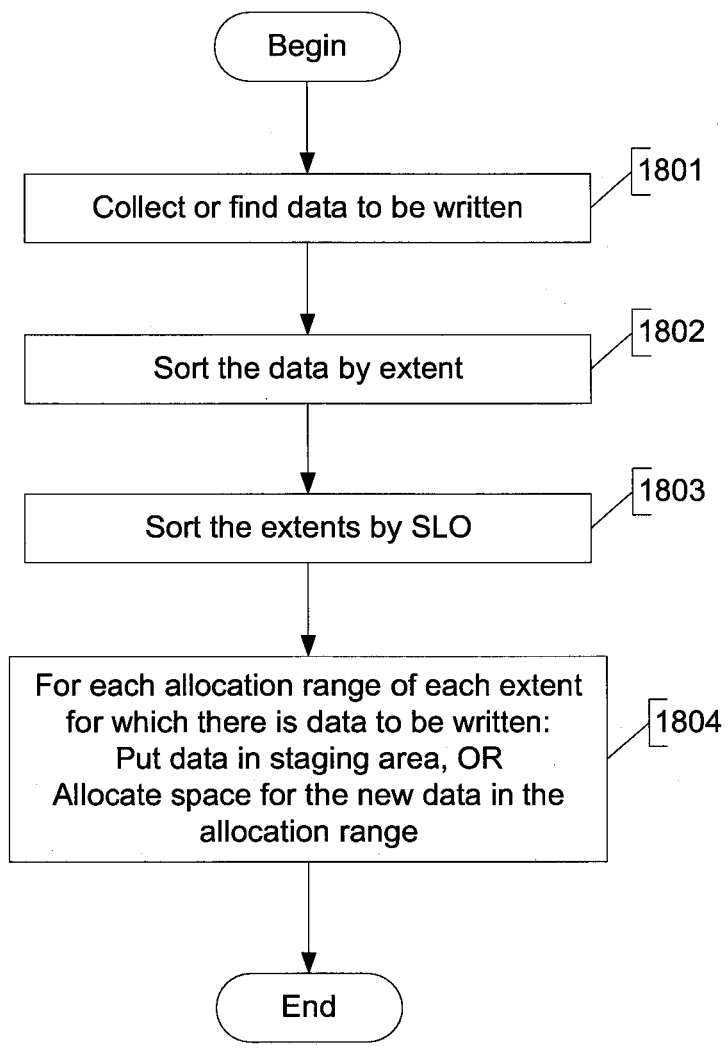
FIGS. 18 through 23 are flowcharts showing examples of the write allocation processes that can be used to balance performance with block sharing.

In general, the same high-level algorithm can be applied to all of the above-mentioned use cases; an example of such an algorithm is illustrated in FIG. 18. More detailed examples are illustrated in FIGS. 19 through 23. The steps shown in FIGS. 18 through 23 can be executed by, for example, a region layout manager 73 (FIG. 7) within the storage manager 460 in any D-module 216 (FIG. 4) of any storage node.

In the process of FIG. 18, the system initially collects or finds data to be written at 1801 (the manner in which this data is collected or found depends on the specific use case, as discussed further below). At 1802 the system sorts the collected/found data by extent.

Next, at 1803 the system sorts the extents of that data by SLO, highest to lowest. Sorting by SLO facilitates later steps that help avoid unnecessary duplication of data blocks, as described further below. It is desirable to write multiple copies of a data block only when SLOs require it. When the system has a block that is shared between multiple extents, it will first process the block when it writes the data for the extent with the highest SLO. This is the extent that puts the tightest constraints on write allocation. As the system looks at other extents that use the block, frequently their lower SLOs will allow the system the flexibility to use the copy of the block that it already wrote.

Finally, at 1804, for each allocation range of each extent of the data to be written, the system either puts the data in the staging area (e.g., flash memory) or allocates space for the new data in the allocation range. Which of these two operations is performed depends on the use case and the specific situation, as discussed further below.

A straightforward example of this process is the basic use case of handling a new write request. In the system, this may be a request from a volume to a region, telling the region to write some data to a single extent. In a more generic file system, a write request might correspond to a write system call or network RPC (e.g., an NFS write request).

Figure 19:
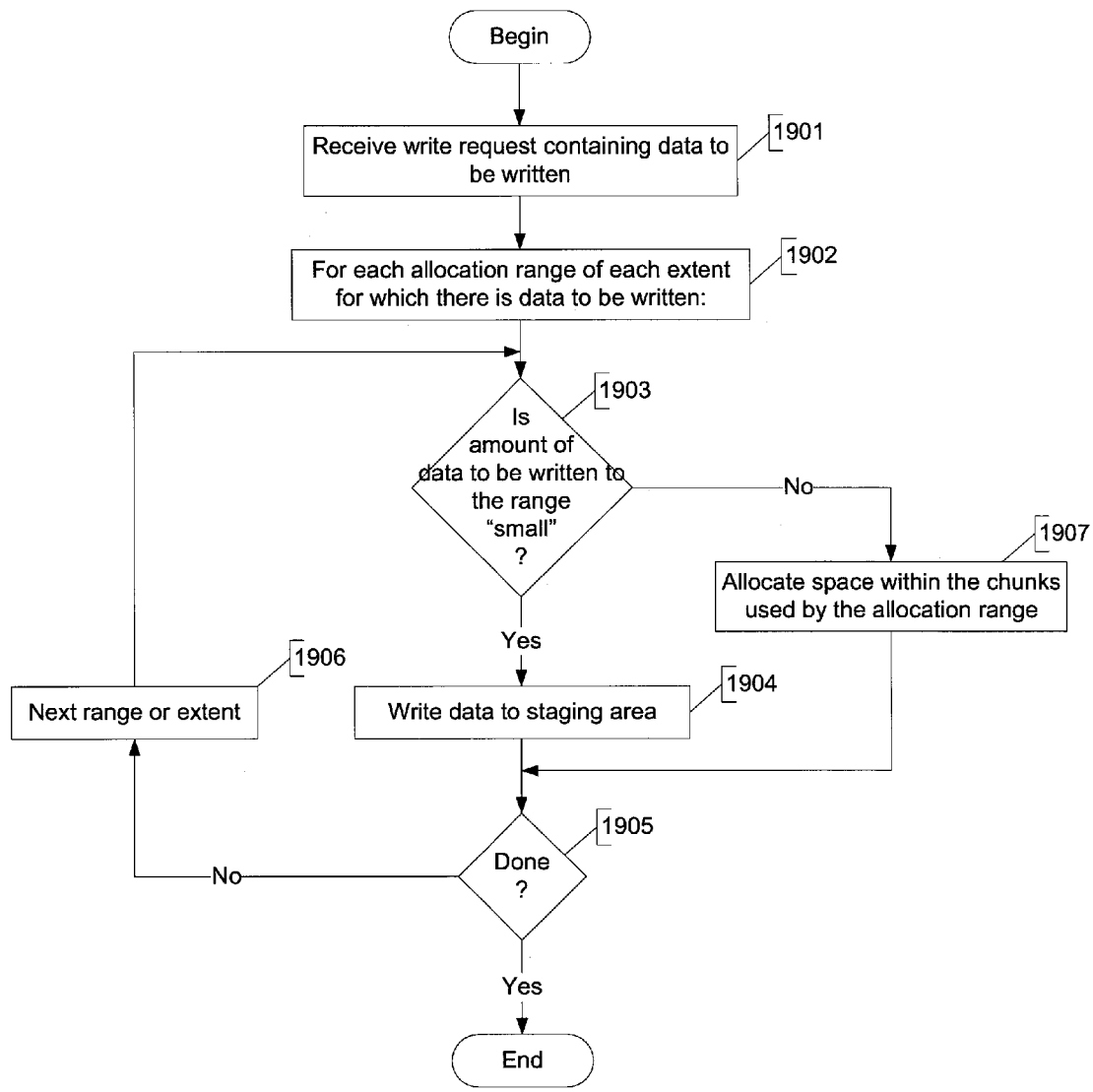

For a new write, the algorithm of FIG. 18 can be implemented as shown in FIG. 19. Initially, at 1901 the system receives a write request containing data to be written to a single extent. Since there is only one extent, there is no need to sort the data by extent. Also, since an extent only has one SLO, there is no need to sort by SLO. Hence, for each allocation range of each extent for which there is data to be written (1902, 1905, 1906), the system does the following: If the amount of data being written to an allocation range is small at 1903, the system writes the data to the staging area at 1904. In this context, "small" can be determined in relation to an arbitrarily defined threshold, based on the relative I/O characteristics of the staging area and regular storage. Otherwise, the system at 1907 allocates space within the chunks of the allocation range currently being considered. This step is described below in greater detail.

Figure 20:
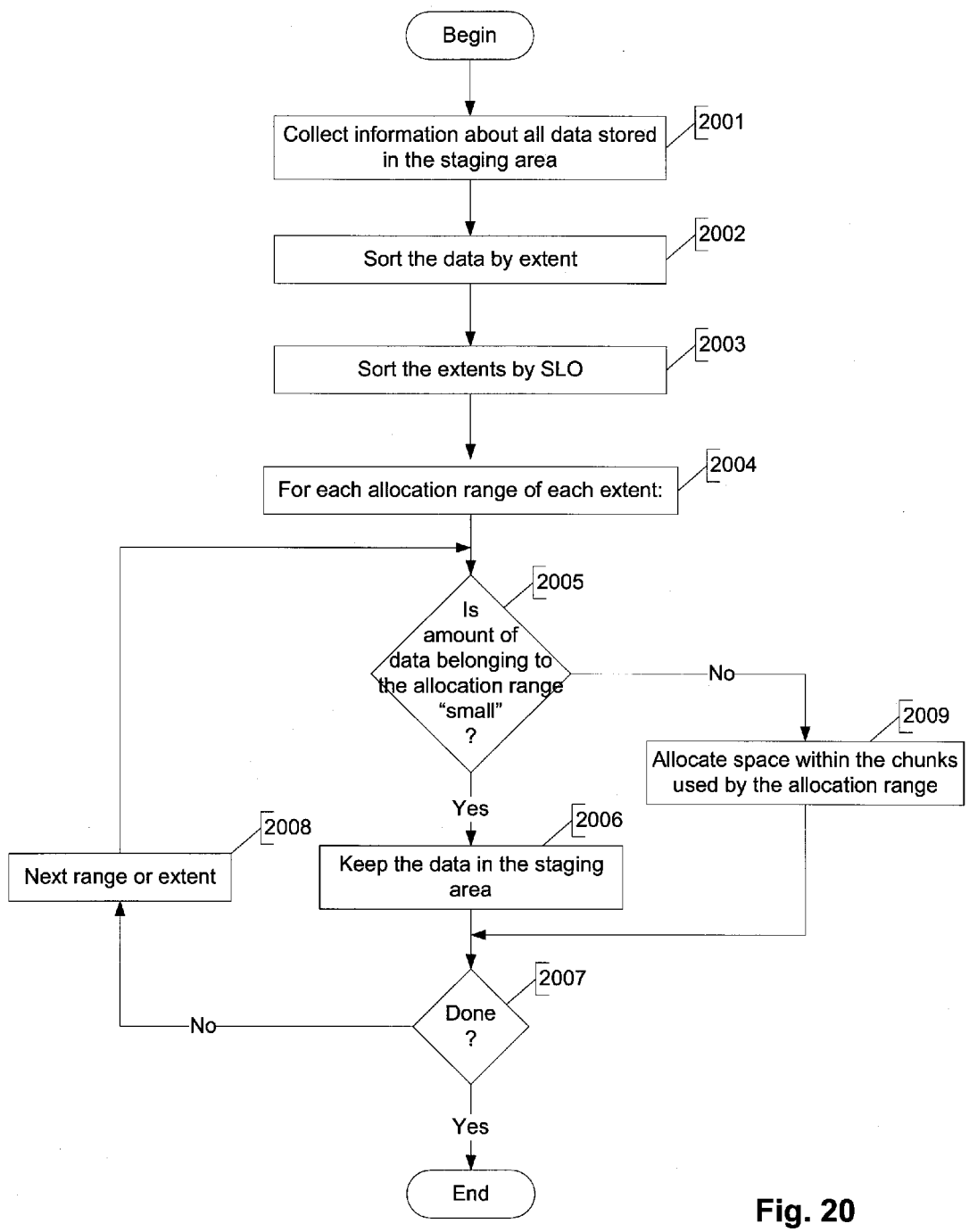

Another use case, as noted above, is when the system destages data from the staging area (e.g., flash memory) to regular storage (e.g., HDDs). In this case, the algorithm of FIG. 18 can be embodied as shown in FIG. 20. This process can be triggered by any of various conditions or events, such as: the staging area becoming full; enough data being stored in the staging area to make the destaging process sufficiently efficient; or the region manager 72 asking to release one or more flash slabs that the region is currently using for the staging area.

Initially, at 2001 the system collects information about all of the data stored in the staging area. The system then sorts the data by extent at 2002 and then sorts the extents by SLO (highest to lowest) at 2003. Next, for each allocation range in each extent stored in the staging area (2004, 2007, 2008), the system does the following: If the data belonging to the allocation range is small at 2005, the system decides to keep that data in the staging area at 2006. Here too, "small" can be determined in relation to an arbitrarily defined threshold, based on the relative I/O characteristics. Otherwise, the system allocates space within the chunks used by the allocation range at 2009. To do this, the system can use one of the algorithms described below.

Regarding steps 2005 and 2006, it is possible for the threshold to be zero. A non-zero threshold would allow the system to leave small pieces of data in the staging area in the expectation that it will get more data for the same allocation range(s). This would provide greater efficiency when the data is ultimately destaged.

An alternative way of deciding when to leave data in the staging area is to use some measure of the efficiency with which the system can write the data to regular storage. For example, the system could leave data in the staging area when its write efficiency is below some threshold. Using the number of blocks from an allocation range is a simplistic efficiency metric. In addition, depending on how the system manages the underlying storage, it may be possible to leave data in the staging area, rather than writing it to a new location in the staging area.

G. Allocation of New Space

Figure 21:
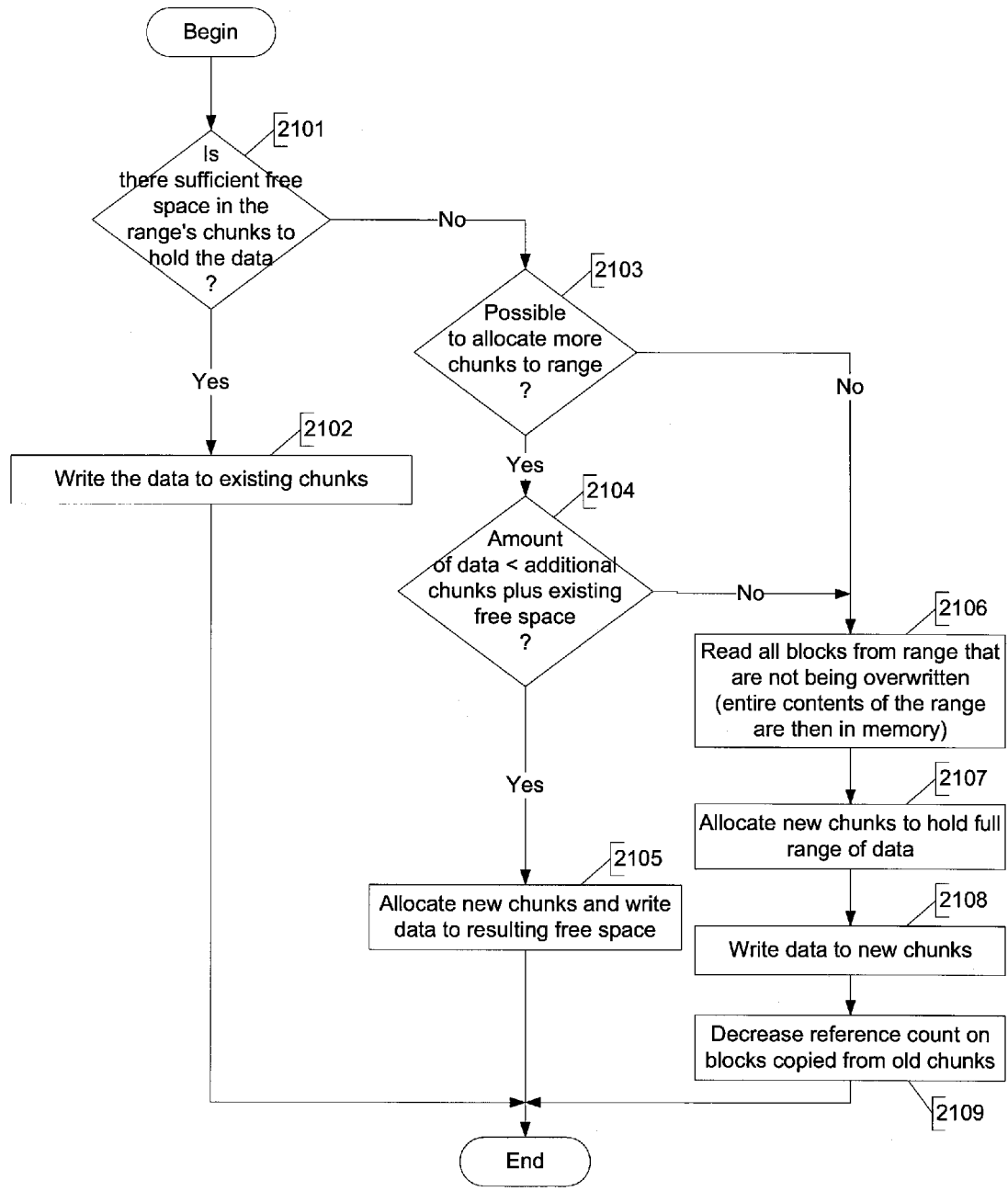

In the various scenarios described above, the system ultimately writes data to regular storage and needs to allocate space for that data. Essentially the same algorithm can be used for all such cases (with some possible modifications/extensions, described below). FIG. 21 illustrates an example of an algorithm that the system can use to allocate space for data to be written. FIG. 21 describes writing one or more data blocks to a single allocation range of a single extent.

Initially, at 2101 the system determines whether there is sufficient free space in the allocation range's chunks to hold the data to be written. If there is sufficient free space, the system writes the data to existing chunks in the allocation range at 2102. Otherwise, the system determines at 2103 whether it is possible to allocate more chunks to the allocation range. It is possible to allocate more chunks to an allocation range if the number of chunks currently allocated to the allocation range is less than the maximum number of chunks allowed for the allocation range, i.e., if MaxChunks=RangeSize/(SLO*ChunkSize). If it is possible to allocate more chunks to the allocation range, then the system determines at 2104 whether the amount of data to be written is less than the additional chunks plus the existing free space in the allocation range's chunks.

If the conditions of 2103 and 2104 are both met, then the system allocates new chunks and writes data to the resulting free space at 2105. If condition 2103 or condition 2104 is not met, then the system proceeds to step 2106. Now consider that there are other blocks in the allocation range that are not being overwritten and that are already allocated. Upon reaching step 2106, therefore, the system has determined that it is not possible to write the new data to free storage space in a way that will achieve the desired layout score. Therefore, the system rewrites the entire allocation range to new storage space where it can achieve the layout score required to meet the applicable SLO. At step 2106, therefore, the system reads all blocks from the allocation range that are not being overwritten; the system then has the entire contents of the allocation range in memory. The system then allocates new chunks to hold the full range of data at 2107 and writes the data to the new chunks at 2108. Ideally the system can allocate completely empty chunks, achieving a layout score close to 100. However, it is sufficient to allocate chunks with an average free space equal to the desired SLO. Finally, at 2109 decreases the reference counts on the blocks that were copied from old chunks.

Some overhead may result from the copying of data in steps 2106 through 2108. However, such overhead should be tolerable, because the system will accumulate small writes in the staging area, allowing it to amortize the copy overhead across many blocks of write data. Also, the organization of data into chunks allows the system to copy data using efficient track-sized (i.e., chunk-sized) I/O operations.

Note that steps 2106 through 2109 are where the system may decrease deduplication (decrease block sharing) in order to meet SLOs. In particular, some of the unmodified blocks that the system copies may be shared blocks (i.e., reference count>1). When the system copies them, it will be creating new copies of those blocks, since the original copy will also remain.

Figure 22:
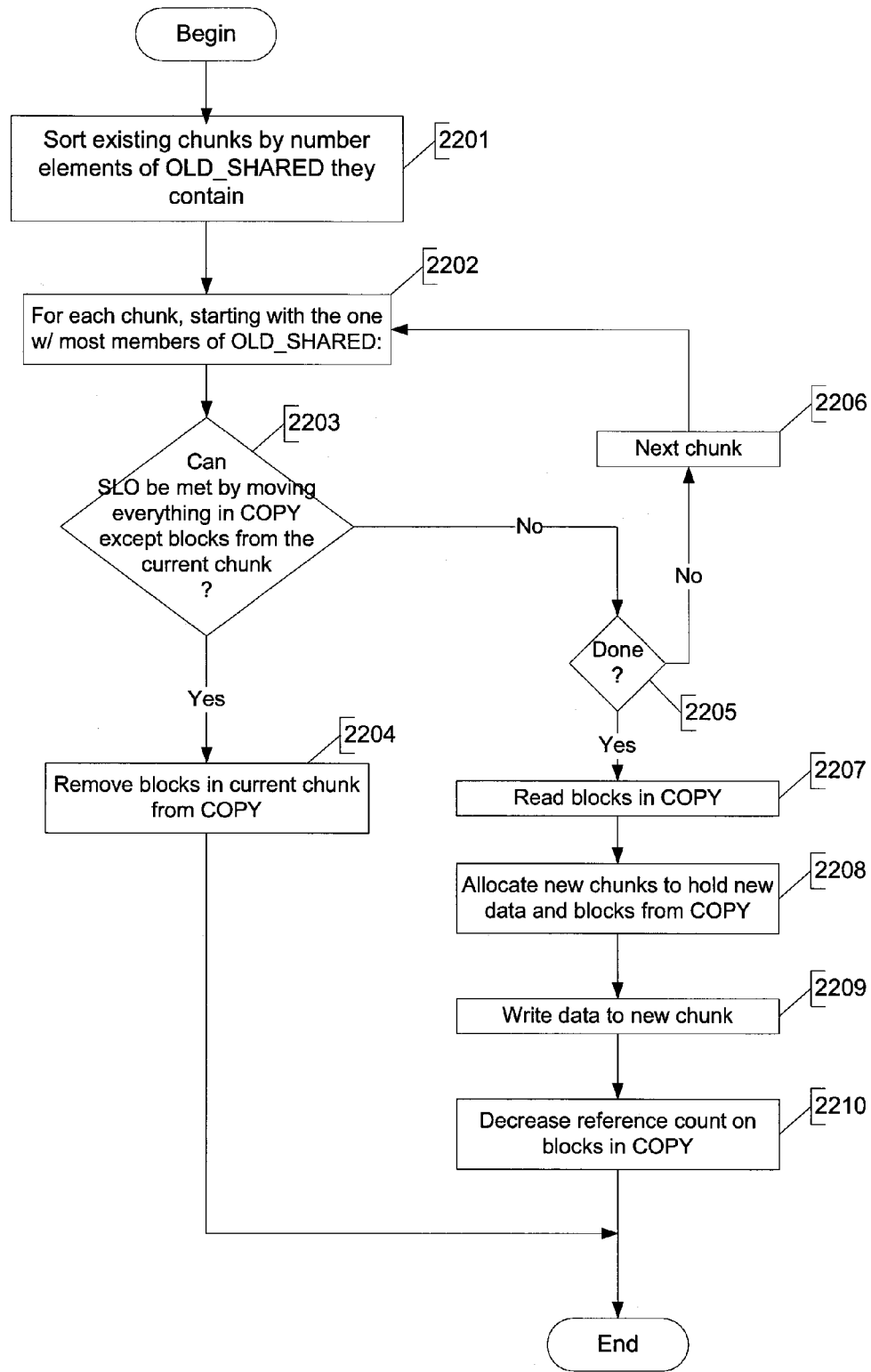

Yet it is desirable to avoid breaking block sharing when possible. To accomplish that, the algorithm of FIG. 21 can be enhanced as shown in FIG. 22. The steps in FIG. 22 can replace steps 2106 through 2109 in FIG. 21. Before discussing these steps, the following parameters are defined to facilitate description:

COPY is defined as the set of blocks, from the currently considered allocation range, that are not being overwritten; and OLD_SHARED is defined as the set of blocks in COPY that have reference count>1 (i.e., shared blocks).

Referring to FIG. 22, at 2201 the system sorts the chunks, in the allocation range currently being considered, by the number of blocks in OLD_SHARED that they contain. Next, for each chunk in the allocation range, starting with the one with the most members of OLD_SHARED (2202, 2205, 2206), the system determines whether the applicable SLO can be met by moving everything in COPY except the blocks from the current chunk. If the outcome of that determination is affirmative, the system then removes the blocks in the current chunk from COPY.

After all of the chunks in the allocation range have been processed in this way, the system then reads all of the blocks in COPY at 2207, allocates new chunks to hold the new data and the blocks from COPY at 2208, writes all of that data to the new chunks at 2209, and finally, decreases the reference count on all of the blocks in COPY at 2210.

When the system is writing data, there may be duplicate (or shared) blocks. In other words, when the system sorts data blocks by extent (step 1802 in FIG. 18), there may be blocks that belong to more than one extent. The algorithms described above will write a copy of a shared block for each extent that uses it. However, it is desirable to write multiple copies of a data block only when SLOs require it. This is one reason for the sorting of extents by SLO (step 1803 in FIG. 18), as mentioned above. Hence, when the system has a block that is shared between multiple extents, it will first process it when it writes the data for the extent with the highest SLO. As the system looks at other extents that use the block, frequently their lower SLOs will allow the system the flexibility to use the copy of the block that it already wrote.

Figure 23:
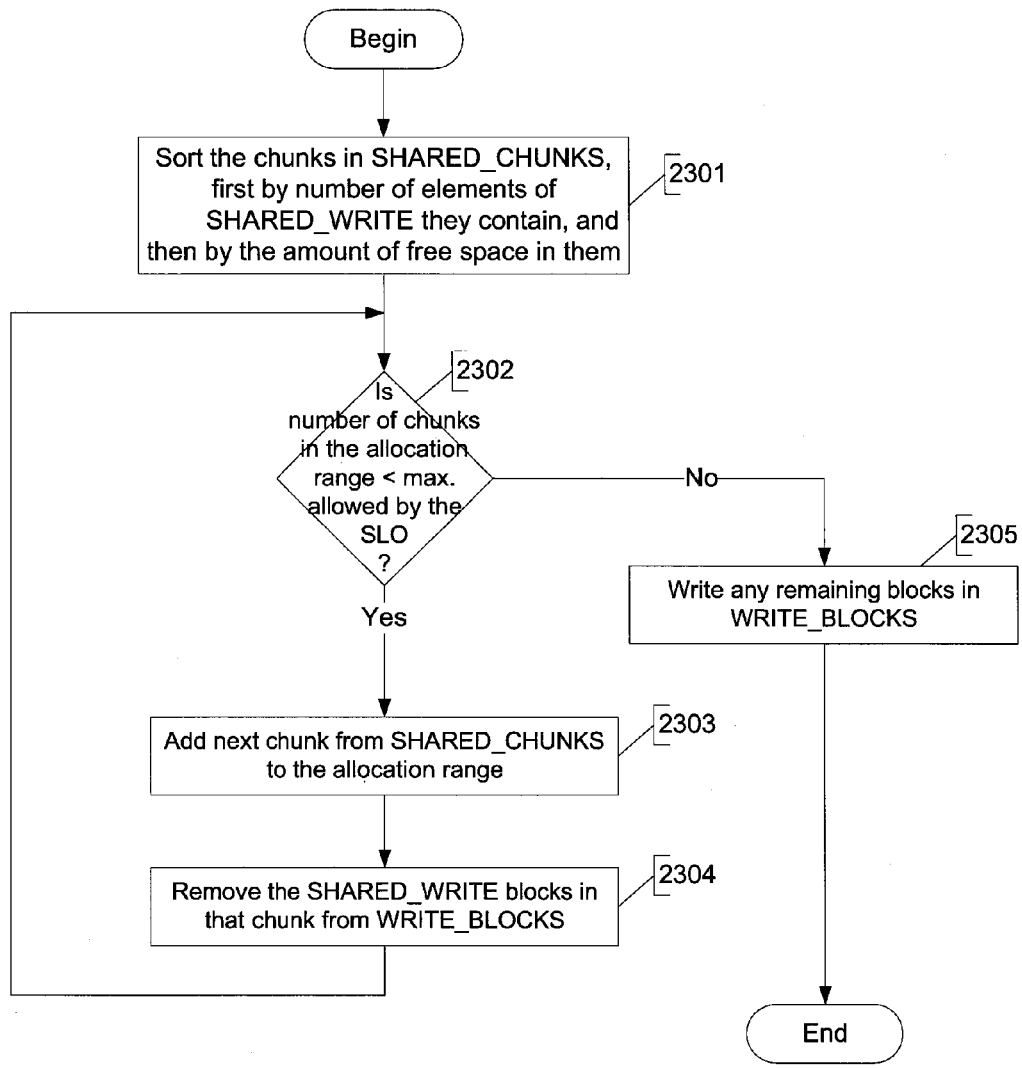

To take advantage of a copy of a block that has already been written, the system attempts to include that block's chunk as part of the extent when it writes it. The resulting extension of the allocation algorithm can be as illustrated in FIG. 23.

The following parameters are defined to facilitate description:

WRITE_BLOCKS is defined as the set of blocks to be written;

SHARED_WRITE is defined as the blocks of WRITE_BLOCKS that already have a copy in regular storage, i.e., the shared blocks of which the system wrote a copy for a previous extent; and SHARED_CHUNKS is defined as the set of chunks that contain one or more of the blocks in SHARED_WRITE.

Referring to FIG. 23, at 2301 the system sorts the chunks in SHARED_CHUNKS, first by the number of blocks in SHARED_WRITE that they contain, and then by the amount of free space in the chunks. The system then does the following while the number of chunks in the allocation range is less then the maximum number of chunks allowed by the SLO (2302):

First, the system adds the next chunk from SHARED_CHUNKS to the allocation range at 2303. Then, the system removes the SHARED_WRITE blocks in that chunk from WRITE_BLOCKS at 2304.

When the number of chunks in the allocation range has reached or exceeded the maximum number of chunks allowed by the SLO, the system then writes any remaining blocks in WRITE_BLOCKS. This may be done according to the algorithm of FIG. 22.

Note that the algorithm of FIG. 23 is essentially a heuristic for preserving block sharing; as such, there is no guarantee that it will maximize the amount of block sharing in the system. The algorithm can be used when the system finds duplicate copies of a data block in a region and wants to determine whether it can reduce the number of copies of that block that it maintains. In that case, the system can use the algorithm of FIG. 18, where the set of blocks to be written is the set of logical copies of the block the system wants to deduplicate.

If the system has a highly shared block with SLOs that prevent it from effectively deduplicating the block, an alternative is to store a single instance of the block in flash memory only. As described above, in one embodiment the system does not count any blocks in flash memory against the layout score for an extent. Therefore, a single flash-based copy of a block can be used for all extents with references to the block.

X. Assimilation of Foreign LUNs

It may be desirable for a given storage server node to be able to incorporate effectively the storage space of one or more LUNs from a storage device made by a third-party manufacturer; such nodes are referred to as "foreign" LUNs (as opposed to "native" LUNs). The system introduced here provides such capability. In particular, by defining one or more slabs as portions of a foreign LUN, the foreign LUN can be easily assimilated into the system and its storage allocated to extents in one or more regions. In such a situation, the system is essentially interposed between the clients and the foreign LUN. In some cases, an entire foreign LUN may be mapped to a single logical extent. In other cases, a foreign LUN may be mapped to multiple extents.

Figure 24:
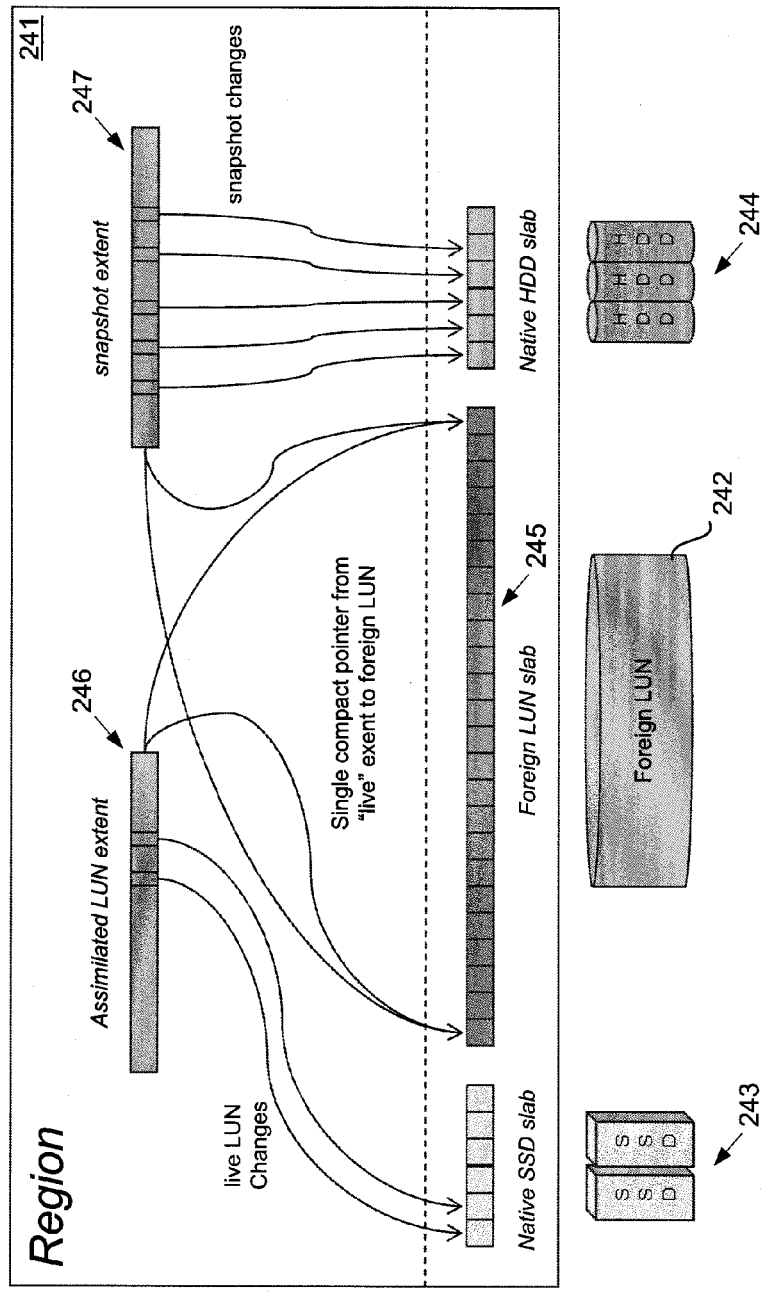
FIG. 24 through 26 are flowcharts showing examples of assimilation of a foreign LUN.

FIG. 24 shows an example of how a foreign LUN can be assimilated into the system. Specifically, FIG. 24 shows a region 241 that uses essentially a direct mapping of an extent 246 to a foreign LUN 242. To provide better performance for writes, the region 241 also uses SSDs 243 (e.g., flash) to cache write-back changes to the foreign LUN. Since it is expected that the number of blocks staged in the SSD cache will be small relative to the size of the foreign LUN, all that is needed to keep track of these changes is a pointer to the foreign LUN and an "exception list" to track the blocks where the data is cached in SSDs instead of the foreign LUN. This exception list can be implemented in the form of a hash table, for example.

The region 241 also uses HDDs 244 to hold blocks for snapshots of the foreign LUN 242 in at least one snapshot extent 247, with snapshot changes stored as a snapshot exception list. As blocks on the foreign LUN are overwritten, the system copies the old values of the blocks to new locations in native storage (e.g., HDDs 244) and updates the snapshot's extent metadata to point to those blocks. At least initially it may be practical to store the exception list as a hash table, although as the exception list grows with the number of changes, it may become more efficient to store it in a buffer tree format.

In a similar manner, the system can clone a foreign LUN, using native storage. Thus, the system can seamlessly (i.e., without disturbing the data on the foreign LUN) provide value-added services in relation to a foreign LUN, such as snapshotting and/or cloning. A simple foreign LUN might not be capable of implementing these features on its own, or it might do it in a way that imposes substantial performance overhead or storage space overhead.

Note that using SSDs to destage writes to the foreign LUN and using HDDs to store snapshot changes are synergistic techniques/features. That is, accumulating small updates to the foreign LUN in SSDs avoids the need to copy the corresponding "old" data to native storage and the snapshot extent until the system destages the data from the SSDs to the foreign LUN. Consequently, in addition to the benefits of bulk update to the foreign LUN, the system can also read the overwritten blocks in bulk and update the native HDD storage in bulk.

As noted above, each slab corresponds to a sequential set of block addresses in physical storage. Consequently, it is not necessary for the region to maintain a separate pointer for each block of the foreign LUN. Because all of the blocks of the LUN appear in sequential order on the corresponding extent, the only metadata needed to access the foreign LUN is: identification information to find the LUN (i.e., device ID and actual LUN ID), starting offset within the LUN, and number of blocks being targeted in the LUN. These items of information together can be treated as a single compact pointer to the foreign LUN.

Figure 25:
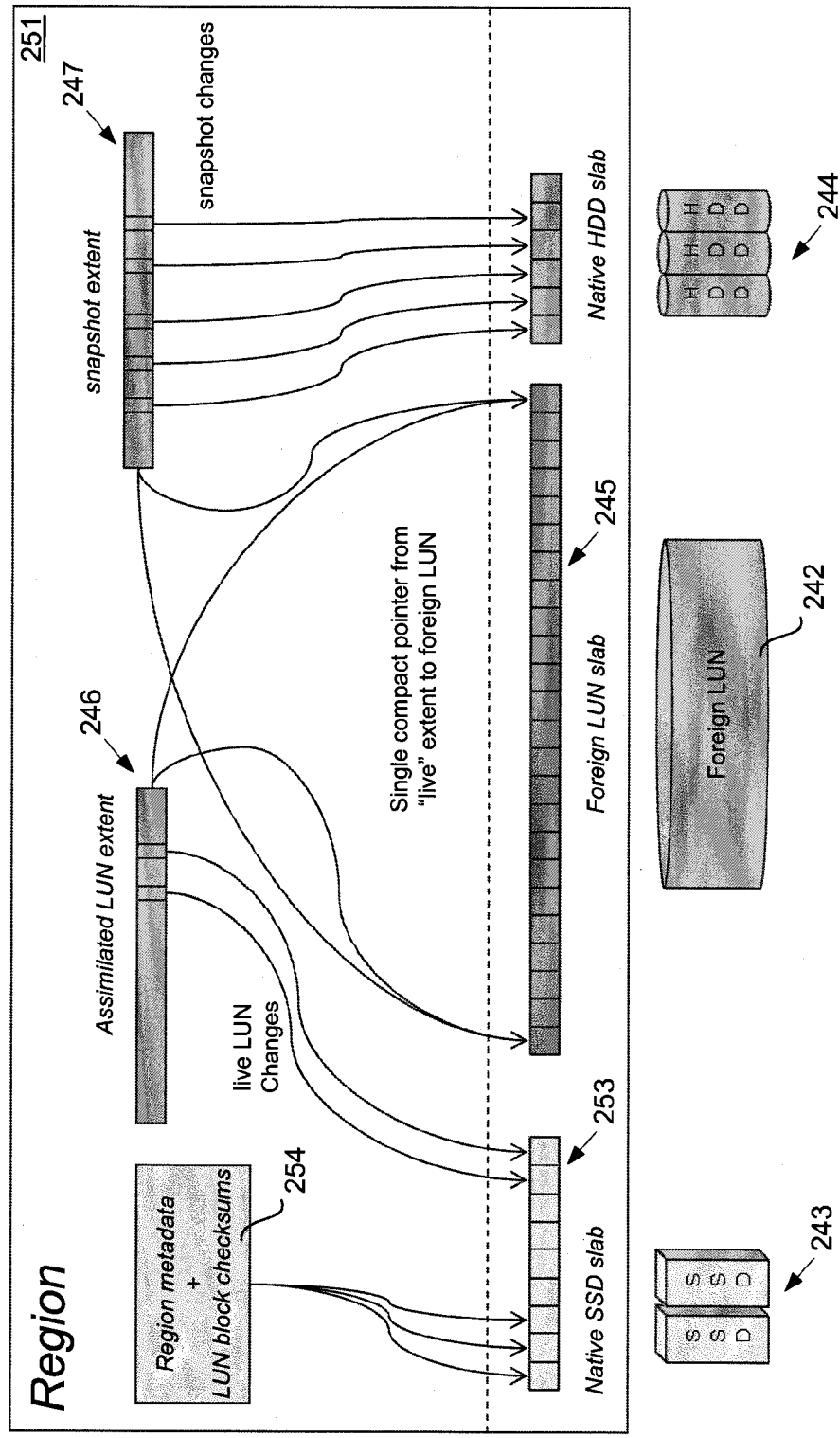

FIG. 25 shows another foreign LUN example. The difference in this case from that of FIG. 24 is that the system is making more extensive use of SSDs to provide higher levels of data integrity on the foreign LUN 242. Specifically, within the region 251, one extent 254 which is mapped to an SSD slab 253 is being used to store data integrity metadata such as block checksums for the foreign LUN 242, and also to store the region's metadata for the foreign LUN 242. The checksums allow the system to detect corrupted data blocks of the foreign LUN 242. Whenever the system writes a block to the foreign LUN 242, it updates the checksum information for that block. Likewise, whenever the system reads a block from the foreign LUN 242, it validates it using the checksum. The metadata stored in the extent 254 may be as simple as, for example, a table that maps extent IDs to block ranges in the foreign storage. The use of the separate extent 254 to store data integrity information for the foreign LUN 242 allows the system to effectively improve the data integrity of the foreign LUN without disturbing the data on, or the performance of, the foreign LUN. Note that foreign LUN metadata and/or other region metadata may also be stored in the same way in the configuration of FIG. 24.

Figure 26:
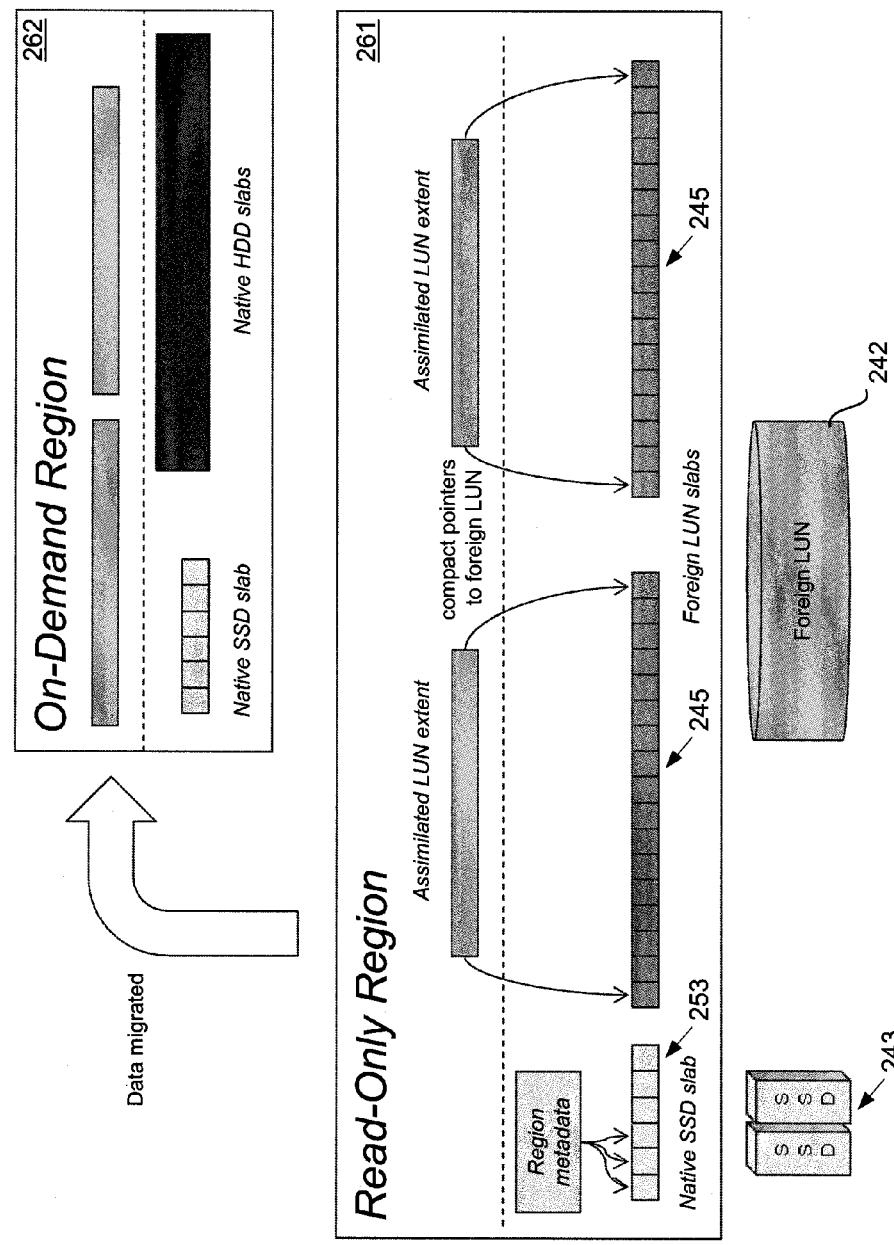

FIG. 26 shows an embodiment which allows the data on the foreign LUN 242 to be transparently (to clients) migrated onto native storage. In this example region 261 is read-only and a separate, "on-demand" region 262 is placed "in front of" the read-only region 261. It may be simplest in this use case to represent the foreign LUN with a single extent in each region 261, 262. The on-demand region 262 is mapped to native storage, such as SSDs and HDDs. New changes to extents are written to the "on-demand" region 262. When reading data, if the requested data is not already present in the on-demand region 262, it is read from the read-only region 261 and copied into the on-demand region 262 as it is provided to the requester. A special block pointer can be used in the on-demand region 262 to identify blocks that have not yet been copied from the read-only region 261. Eventually, all of the data in the foreign LUN can be transparently copied into the on-demand region in this way. If it is desired to actively migrate the data, it is straightforward to have a thread in the system simply "walk through" the extent representing the foreign LUN, reading it from beginning to end to force the filling-in of the on-demand region 262.

The techniques introduced above can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:

in a data storage system, defining a plurality of regions to contain data, the plurality of regions including a plurality logical extents;

in the data storage system, defining a first slab as a portion of a foreign logical unit (LUN), and allocating at least a portion of the first slab to a first logical extent of the plurality of logical extents, the first logical extent being included within a first region of the plurality of regions, wherein a device associated with the foreign LUN is not manufactured by a manufacturer of the data storage system and the device associated with the foreign LUN is not specifically designed for use with the data storage system;

storing at least one write-back change to the foreign LUN in a native storage separate from the foreign LUN; and in the data storage system, maintaining a plurality of volumes as logical containers of data, each of the volumes including one or more of the logical extents from one or more of the regions, wherein layouts of the logical extents within the regions are not visible to the plurality of volumes.

2. A method as recited in claim 1, wherein the first slab corresponds to a sequential set of block addresses of the foreign LUN.

3. A method as recited in claim 1, wherein the foreign LUN is at least partially mapped to the first logical extent by a sequential set of block addresses.

4. A method as recited in claim 3, wherein the foreign LUN is mapped in its entirety to the first logical extent as a single sequential set of block addresses.

5. A method as recited in claim 1, wherein the first slab is one of a plurality of slabs allocated to the plurality of regions, wherein at least one of the plurality of slabs is defined as a set of blocks in one or more physical storage devices.

6. A method as recited in claim 1, further comprising:
using a single pointer to map the first extent to the first slab.

7. A method as recited in claim 1, further comprising:
using the first logical extent to represent a portion of an active version of the foreign LUN.

8. A method as recited in claim 7, further comprising:
allocating at least a portion of a second slab to a second logical extent, of the plurality of logical extents, in the first region; and
using the second logical extent to represent a snapshot or clone of the foreign LUN.

9. A method as recited in claim 7, further comprising:
configuring the first region to be read-only;
configuring a second region, of the plurality of regions, to be a native, read-write region in the data storage system;
servicing a write that targets the foreign LUN by writing data to the second region;
servicing a read that targets the foreign LUN by reading data from the second region if data targeted by the read has been copied into the second region or from the first region if the data targeted by the read has not been copied into the second region; and
in response to reading data from the first region, writing data read from the first region to the second region.

10. A method as recited in claim 1, further comprising:
using a second slab, of the plurality of slabs, in the first region, to cache write-back changes to the foreign LUN, including random writes, wherein the second slab is allocated to the first logical extent, and wherein the second slab is defined as a set of blocks from one or more solid-state storage devices.

11. A method as recited in claim 1, further comprising:
using a second slab, of the plurality of slabs, in the first region, to store data integrity metadata for the foreign LUN.

12. A method as recited in claim 11, wherein the data integrity metadata comprises LUN block checksums for the foreign LUN.

13. A method as recited in claim 11, further comprising:
using a slab, of the plurality of slabs, in the first region, to store region metadata for the first region.

14. A method as recited in claim 11, wherein the first slab is defined as a set of blocks from one or more solid-state storage devices.

15. The method of claim 1, where the native storage is referenced by the first logical extent, the native storage comprising a native logical unit.

16. The method of claim 1, further comprising destaging the stored write-back changes to a separate native logical unit.

17. A method comprising:
in a network storage server, defining a plurality of regions to contain data, the plurality of regions including a plurality of logical extents, wherein a plurality of slabs are allocated to the plurality of regions, wherein allocated to each said logical extent is at least a portion of one or more slabs allocated to a region that includes said logical extent, at least some of the slabs being defined each as a set of blocks in one or more physical storage devices;
in the network storage server, defining at least a portion of a first slab, of the plurality of slabs, to represent a portion of a foreign logical unit (LUN), wherein the first slab corresponds to a sequential set of addresses of the foreign LUN, wherein a device associated with the foreign LUN is not manufactured by a manufacturer of the network storage server and the device associated with the foreign LUN is not specifically designed for use with the network storage server, and wherein the foreign LUN is maintained in a read-only region;
in the network storage server, allocating said at least a portion of the first slab to a first logical extent of the plurality of logical extents, the first logical extent being included within a first region of the plurality of regions;
storing at least one write-back change to the foreign LUN in a native solid state storage separate from the foreign LUN;
storing at least one snapshot of at least a portion of the foreign LUN in a native hard disk storage separate from the foreign LUN; and
in the network storage server, maintaining a plurality of volumes as logical containers of data, each of the volumes including one or more of the logical extents from one or more of the regions, wherein layouts of the logical extents within the regions are not visible to the plurality of volumes.

18. A method as recited in claim 17, wherein the foreign LUN is at least partially mapped to the first logical extent by a sequential set of block addresses.

19. A method as recited in claim 18, wherein the foreign LUN is mapped in its entirety to the first logical extent as a single sequential set of block addresses.

20. A method as recited in claim 17, wherein the plurality of slabs comprises slabs defined from a heterogeneous pool of physical storage devices, and wherein at least two of the slabs are defined from at least two different types of physical storage devices.

21. The method of claim 17, wherein the native solid state storage and the native hard disk storage are located in an on-demand region.

22. A network storage server comprising:
a network adapter through which to communicate with a plurality of storage clients via a network;
a storage adapter through which to access a set of physical storage devices; and
a computer readable storage medium comprising instructions that, when executed, cause a processor to execute operations including:
defining a plurality of regions to contain data, the plurality of regions including a plurality logical extents;
defining at least a portion of a first slab as a portion of a foreign logical unit (LUN), and allocating said at least a portion of the first slab to a first logical extent of the plurality of logical extents, the first logical extent being included within a first region of the plurality of regions, wherein a device associated with the foreign LUN is not manufactured by a manufacturer of the network storage server and the device associated with the foreign LUN is not specifically designed for use with the network storage server;

storing at least one write-back change to the foreign LUN in a native storage separate from the foreign LUN; and maintaining a plurality of volumes as logical containers of data, each of the volumes including one or more of the logical extents from one or more of the regions, wherein layouts of the logical extents within the regions are not visible to the plurality of volumes.

23. A network storage server as recited in claim 22, wherein the first slab corresponds to a sequential set of block addresses of the foreign LUN.

24. A network storage server as recited in claim 22, wherein the foreign LUN is at least partially mapped to the first logical extent by a sequential set of block addresses.

25. A network storage server as recited in claim 24, wherein the foreign LUN is mapped in its entirety to the first logical extent as a single sequential set of block addresses.

26. A network storage server as recited in claim 22, wherein the first slab is one of a plurality of slabs allocated to the plurality of regions, wherein at least one of the plurality of slabs is defined as a set of blocks in one or more of the plurality of physical storage devices.

27. A network storage server as recited in claim 22, wherein said operations further comprise:
using a single pointer to map the first extent to the first slab.

28. A network storage server as recited in claim 22, wherein said operations further comprise:
using the first logical extent to represent a portion of an active version of the foreign LUN.

29. A network storage server as recited in claim 28, wherein said operations further comprise:
allocating a second slab to a second logical extent, of the plurality of logical extents, in the first region; and
using the second logical extent to represent a snapshot or clone of the foreign LUN.

30. A network storage server as recited in claim 28, wherein said operations further comprise:
configuring the first region to be read-only;
configuring a second region, of the plurality of regions, to be a native, read-write region in the data storage system;
servicing a write that targets the foreign LUN by writing data to the second region;
servicing a read that targets the foreign LUN by reading data from the second region if data targeted by the read has been copied into the second region or from the first region if the data targeted by the read has not been copied into the second region; and
in response to reading data from the first region, writing data read from the first region to the second region.

31. A network storage server as recited in claim 28, wherein said operations further comprise:
using a second slab, of the plurality of slabs, in the first region, to cache write-back changes to the foreign LUN, including random writes, wherein the second slab is allocated to the first logical extent, and wherein the second slab is defined as a set of blocks from one or more solid-state storage devices.

32. A network storage server as recited in claim 28, wherein said operations further comprise:
using a slab, of the plurality of slabs, in the first region, to store data integrity metadata for the foreign LUN.

33. A network storage server as recited in claim 28, wherein the data integrity metadata comprises LUN block checksums for the foreign LUN.

34. A network storage server as recited in claim 28, wherein said operations further comprise:
using a slab, of the plurality of slabs, in the first region, to store region metadata for the first region.

35. A network storage server as recited in claim 28, wherein the first slab is defined as a set of blocks from one or more solid-state storage devices.

36. A storage system node for use in a cluster of storage system nodes, the storage system node comprising:
an N-module configured to provide network communication services to communicate with a storage host over a network, the N-module further configured to communicate with a separate D-module in each of the plurality of storage server nodes in the cluster; and
a D-module operatively coupled to the N-module and configured to provide storage and retrieval of data objects in a nonvolatile mass storage facility which includes a plurality of physical storage devices, the D-module configured to:
define a plurality of regions to contain data, the plurality of regions including a plurality of logical extents, wherein a plurality of slabs are allocated to the plurality of regions, wherein allocated to each said logical extent is at least a portion of one or more slabs allocated to a region that includes said logical extent, at least some of the slabs being defined each as a set of blocks in one or more physical storage devices;
define at least a portion of a first slab, of the plurality of slabs, to represent a portion of a foreign logical unit (LUN), wherein the first slab corresponds to a sequential set of addresses of the foreign LUN, wherein a device associated with the foreign LUN is not manufactured by a manufacturer of the storage system node and the device associated with the foreign LUN is not specifically designed for use with the storage system node;
allocate at least a portion of the first slab to a first logical extent of the plurality of logical extents, the first logical extent being included within a first region of the plurality of regions;
store at least one write-back change to the foreign LUN in a native storage separate from the foreign LUN; and
maintain a plurality of volumes as logical containers of data, each of the volumes including one or more of the logical extents from one or more of the regions, wherein layouts of the logical extents within the regions are not visible to the plurality of volumes.

37. A storage system node as recited in claim 36, wherein the foreign LUN is at least partially mapped to the first logical extent by a sequential set of block addresses.

38. A storage system node as recited in claim 37, wherein the foreign LUN is mapped in its entirety to the first logical extent as a single sequential set of block addresses.

39. A storage system node as recited in claim 36, wherein the plurality of slabs comprises slabs defined from a heterogeneous pool of physical storage devices, and wherein at least two of the slabs are defined from at least two different types of physical storage devices.

* * * * *

UNITED STATES PATENT AND TRADEMARK OFFICE
CERTIFICATE OF CORRECTION

| | | |
|---|---|---|
| PATENT NO. | : 8,555,022 B1 | Page 1 of 1 |
| APPLICATION NO. | : 12/683390 | |
| DATED | : October 8, 2013 | |
| INVENTOR(S) | : John K. Edwards et al. | |

It is certified that error appears in the above-identified patent and that said Letters Patent is hereby corrected as shown below:

In the Specification

In column 8, line 5, delete "interlace" and insert -- interface --, therefor.

Signed and Sealed this
Fourth Day of February, 2014

Michelle K. Lee
*Deputy Director of the United States Patent and Trademark Office*